United States Patent
Renkis

(10) Patent No.: US 10,115,279 B2
(45) Date of Patent: Oct. 30, 2018

(54) SURVEILLANCE MONITORING SYSTEMS AND METHODS FOR REMOTELY VIEWING DATA AND CONTROLLING CAMERAS

(71) Applicant: Sensomatic Electronics, LLC, Westford, MA (US)

(72) Inventor: Martin Renkis, Nashville, TN (US)

(73) Assignee: Sensomatic Electronics, LLC, Westford, MA (US)

( * ) Notice: Subject to any disclaimer, the term of this patent is extended or adjusted under 35 U.S.C. 154(b) by 0 days.

(21) Appl. No.: 15/356,479

(22) Filed: Nov. 18, 2016

(65) Prior Publication Data

US 2017/0178475 A1 Jun. 22, 2017

Related U.S. Application Data

(63) Continuation of application No. 10/977,762, filed on Oct. 29, 2004, now abandoned.

(51) Int. Cl.
| | |
|---|---|
| G08B 13/196 | (2006.01) |
| H04L 29/08 | (2006.01) |
| H04L 29/06 | (2006.01) |
| H04N 7/18 | (2006.01) |
| H04N 5/232 | (2006.01) |
| G06T 7/20 | (2017.01) |

(52) U.S. Cl.
CPC ........ *G08B 13/1966* (2013.01); *G06T 7/2033* (2013.01); *H04L 67/10* (2013.01); *H04L 67/42* (2013.01); *H04N 5/23206* (2013.01); *H04N 7/181* (2013.01); *H04N 7/188* (2013.01)

(58) Field of Classification Search
CPC ....................... G08B 13/19641; G08B 13/1966
USPC .......................................................... 709/217
See application file for complete search history.

(56) References Cited

U.S. PATENT DOCUMENTS

| | | |
|---|---|---|
| 4,148,019 A | 4/1979 | Durkee |
| 4,699,484 A | 10/1987 | Howell et al. |
| 4,771,305 A | 9/1988 | Potoroka |
| 5,086,385 A | 2/1992 | Launey et al. |
| 5,257,007 A | 10/1993 | Steil et al. |
| 5,485,964 A | 1/1996 | Booth et al. |
| 5,584,576 A | 12/1996 | Wei Hong |
| 5,586,171 A | 12/1996 | McAllister et al. |
| 5,598,351 A | 1/1997 | Chater et al. |
| 5,653,412 A | 8/1997 | Martorano et al. |
| 5,673,022 A | 9/1997 | Patel |
| 5,697,099 A | 12/1997 | Siska, Jr. et al. |

(Continued)

OTHER PUBLICATIONS

NPL Google search.pdf.*

(Continued)

*Primary Examiner* — Luis Perez Fuentes
(74) *Attorney, Agent, or Firm* — Perkins Coie LLP

(57) ABSTRACT

A surveillance systems monitors a predetermined environment based on received data. The surveillance system includes a first intelligent appliance configured to capture video and/or still images and configured to be in wireless communication with a second intelligent appliance that operates based on data from the first intelligent appliance. The surveillance system can detect a person located within the predetermined environment and can track the person's movement. The surveillance system is configured to allow remote viewing of data and/or controlling cameras.

21 Claims, 10 Drawing Sheets

(56) References Cited

U.S. PATENT DOCUMENTS

| | | | |
|---|---|---|---|
| 5,898,831 A | 4/1999 | Hall et al. | |
| 5,982,297 A | 11/1999 | Welle | |
| 6,052,574 A | 4/2000 | Smith, Jr. | |
| 6,122,678 A | 9/2000 | Eckel et al. | |
| 6,211,907 B1 | 4/2001 | Scaman et al. | |
| 6,226,035 B1 | 5/2001 | Korein et al. | |
| 6,249,223 B1 | 6/2001 | Christensen | |
| 6,300,976 B1 | 10/2001 | Fukuoka | |
| 6,310,571 B1 | 10/2001 | Yang et al. | |
| 6,335,742 B1 | 1/2002 | Takemoto | |
| 6,380,880 B1 | 4/2002 | Bidermann | |
| 6,437,819 B1 | 8/2002 | Loveland | |
| 6,452,152 B1 | 9/2002 | Yang | |
| 6,498,336 B1 | 12/2002 | Tian et al. | |
| 6,498,576 B1 | 12/2002 | Tian et al. | |
| 6,498,620 B2 | 12/2002 | Schofield et al. | |
| 6,507,083 B1 | 1/2003 | Tian | |
| 6,518,909 B1 | 2/2003 | Yang et al. | |
| 6,522,352 B1 | 2/2003 | Strandwitz et al. | |
| 6,526,225 B1 | 2/2003 | Windrem et al. | |
| 6,542,189 B1 | 4/2003 | Tian | |
| 6,545,228 B2 | 4/2003 | Hashimoto | |
| 6,545,258 B2 | 4/2003 | Tian et al. | |
| 6,548,967 B1 | 4/2003 | Dowling et al. | |
| 6,552,746 B1 | 4/2003 | Yang et al. | |
| 6,559,769 B2 | 5/2003 | Anthony et al. | |
| 6,591,474 B2 | 7/2003 | Soloway et al. | |
| 6,609,036 B1 | 8/2003 | Bickford | |
| 6,636,256 B1 | 10/2003 | Passman et al. | |
| 6,665,012 B1 | 12/2003 | Yang et al. | |
| 6,680,748 B1 | 1/2004 | Monti | |
| 6,693,575 B1 | 2/2004 | Yang et al. | |
| 6,697,103 B1 | 2/2004 | Fernandez et al. | |
| 6,697,104 B1 | 2/2004 | Yakobi et al. | |
| 6,698,021 B1 | 2/2004 | Amini et al. | |
| 6,703,939 B2 | 3/2004 | Lehrman et al. | |
| 6,720,990 B1 | 4/2004 | Walker et al. | |
| 6,726,103 B1 | 4/2004 | Motta et al. | |
| 6,737,626 B1 | 5/2004 | Bidermann et al. | |
| 6,759,952 B2 | 7/2004 | Dunbridge et al. | |
| 6,759,956 B2 | 7/2004 | Menard et al. | |
| 6,763,231 B2 | 7/2004 | Takatori et al. | |
| 6,765,619 B1 | 7/2004 | Deng et al. | |
| 6,778,212 B1 | 8/2004 | Deng et al. | |
| 6,778,237 B2 | 8/2004 | Arakawa et al. | |
| 6,788,237 B1 | 9/2004 | Bidermann et al. | |
| 6,791,611 B2 | 9/2004 | Yang | |
| 6,816,184 B1 | 11/2004 | Brill et al. | |
| 6,830,387 B2 | 12/2004 | Rife | |
| 6,831,699 B2 | 12/2004 | Chang et al. | |
| 6,970,183 B1* | 11/2005 | Monroe | G08B 7/062 348/143 |
| 7,002,467 B2* | 2/2006 | Deconinck | G08B 13/1427 340/539.1 |
| 7,002,481 B1* | 2/2006 | Crane | G08B 29/14 324/207.2 |
| 7,015,945 B1 | 3/2006 | Sullivan | |
| 7,019,644 B2 | 3/2006 | Barrie | |
| 7,020,701 B1 | 3/2006 | Gelvin et al. | |
| 7,023,913 B1 | 4/2006 | Monroe | |
| 7,092,369 B2* | 8/2006 | Fuccello | G06F 1/1626 370/328 |
| 7,130,383 B2 | 10/2006 | Naidoo et al. | |
| 7,138,902 B2 | 11/2006 | Menard | |
| 7,148,803 B2 | 12/2006 | Bandy et al. | |
| 7,202,889 B2 | 4/2007 | Suzuki et al. | |
| 7,239,236 B1 | 7/2007 | Britton | |
| 7,283,045 B1* | 10/2007 | Manz | G08B 21/0269 340/506 |
| 7,298,400 B2 | 11/2007 | Taguchi | |
| 7,304,662 B1 | 12/2007 | Sullivan et al. | |
| 7,336,169 B2 | 2/2008 | Coonce et al. | |
| 7,403,220 B2 | 7/2008 | MacIntosh et al. | |
| 7,450,638 B2 | 11/2008 | Iwamura | |
| 7,450,735 B1 | 11/2008 | Shah et al. | |
| 7,603,087 B1* | 10/2009 | Renkis | H04K 3/226 348/143 |
| 7,634,531 B2 | 12/2009 | Abdolsalehi | |
| 7,719,567 B2 | 5/2010 | Renkis | |
| 7,728,871 B2 | 6/2010 | Renkis | |
| 7,730,534 B2 | 6/2010 | Renkis | |
| 7,764,185 B1* | 7/2010 | Manz | G08B 27/005 340/601 |
| 7,784,080 B2 | 8/2010 | Renkis | |
| 7,821,533 B2 | 10/2010 | Renkis | |
| 7,886,010 B1 | 2/2011 | Shankar | |
| 7,899,887 B2 | 3/2011 | Conn et al. | |
| 7,920,528 B2 | 4/2011 | Karaoguz et al. | |
| 7,925,219 B2 | 4/2011 | Renkis | |
| 7,936,370 B2 | 5/2011 | Renkis | |
| 7,954,129 B2 | 5/2011 | Renkis | |
| 8,208,019 B2 | 6/2012 | Renkis | |
| 8,253,796 B2 | 8/2012 | Renkis | |
| 8,457,314 B2 | 6/2013 | Renkis | |
| 8,610,772 B2 | 12/2013 | Renkis | |
| 8,750,509 B2 | 6/2014 | Renkis | |
| 8,750,513 B2 | 6/2014 | Renkis | |
| 8,752,106 B2 | 6/2014 | Renkis | |
| 8,754,946 B2 | 6/2014 | Renkis | |
| 9,407,877 B2 | 8/2016 | Renkis | |
| 2001/0033332 A1* | 10/2001 | Kato | G08B 13/19645 348/211.99 |
| 2001/0040805 A1 | 11/2001 | Lansing et al. | |
| 2001/0042114 A1 | 11/2001 | Agraharam et al. | |
| 2001/0056479 A1 | 12/2001 | Miyayama et al. | |
| 2002/0019985 A1 | 2/2002 | Fuccello et al. | |
| 2002/0024812 A1 | 2/2002 | Agro | |
| 2002/0026636 A1 | 2/2002 | LeComte | |
| 2002/0100052 A1 | 7/2002 | Daniels | |
| 2002/0109863 A1 | 8/2002 | Monroe | |
| 2002/0154791 A1 | 10/2002 | Onuma et al. | |
| 2002/0186180 A1 | 12/2002 | Duda | |
| 2002/0188955 A1 | 12/2002 | Thompson et al. | |
| 2003/0007663 A1 | 1/2003 | Wixson et al. | |
| 2003/0023614 A1 | 1/2003 | Newstrom et al. | |
| 2003/0034387 A1 | 2/2003 | Knowles et al. | |
| 2003/0037341 A1 | 2/2003 | Van Der Meulen | |
| 2003/0050032 A1 | 3/2003 | Masaki | |
| 2003/0053091 A1 | 3/2003 | Tanaka et al. | |
| 2003/0081121 A1* | 5/2003 | Kirmuss | B60R 11/02 348/143 |
| 2003/0112335 A1 | 6/2003 | Strandwitz et al. | |
| 2003/0120745 A1 | 6/2003 | Katagishi et al. | |
| 2003/0137426 A1 | 7/2003 | Anthony et al. | |
| 2003/0184647 A1 | 10/2003 | Yonezawa et al. | |
| 2003/0188320 A1 | 10/2003 | Shing | |
| 2003/0189638 A1 | 10/2003 | Fry | |
| 2003/0193395 A1 | 10/2003 | Ahiska et al. | |
| 2003/0210340 A1 | 11/2003 | Frederick Romanowich | |
| 2004/0001214 A1 | 1/2004 | Monroe | |
| 2004/0002792 A1 | 1/2004 | Hoffknecht | |
| 2004/0008255 A1 | 1/2004 | Lewellen | |
| 2004/0021778 A1 | 2/2004 | Oldani et al. | |
| 2004/0022221 A1 | 2/2004 | Chwieseni et al. | |
| 2004/0046027 A1 | 3/2004 | Leone et al. | |
| 2004/0075547 A1 | 4/2004 | Vojtech et al. | |
| 2004/0093409 A1 | 5/2004 | Thompson et al. | |
| 2004/0105006 A1 | 6/2004 | Lazo et al. | |
| 2004/0113778 A1 | 6/2004 | Script et al. | |
| 2004/0122633 A1 | 6/2004 | Bang et al. | |
| 2004/0133786 A1 | 7/2004 | Tarbouriech | |
| 2004/0136388 A1 | 7/2004 | Schaff | |
| 2004/0165546 A1 | 8/2004 | Roskind et al. | |
| 2004/0168194 A1 | 8/2004 | Hughes | |
| 2004/0228490 A1 | 11/2004 | Klemba et al. | |
| 2004/0246128 A1 | 12/2004 | Menard | |
| 2004/0246336 A1 | 12/2004 | Kelly et al. | |
| 2004/0264700 A1 | 12/2004 | Kirkland | |
| 2005/0012829 A1 | 1/2005 | Tashiro et al. | |
| 2005/0091311 A1 | 4/2005 | Lund et al. | |
| 2005/0100329 A1 | 5/2005 | Lao et al. | |
| 2005/0111701 A1 | 5/2005 | Seki et al. | |
| 2005/0149979 A1 | 7/2005 | Creamer et al. | |

(56) References Cited

U.S. PATENT DOCUMENTS

| | | |
|---|---|---|
| 2005/0179531 A1* | 8/2005 | Tabe .................. B60C 23/0408 340/447 |
| 2005/0201297 A1 | 9/2005 | Peikari |
| 2005/0204026 A1 | 9/2005 | Hoerl |
| 2005/0210532 A1 | 9/2005 | Winick |
| 2005/0250544 A1 | 11/2005 | Grant et al. |
| 2006/0019696 A1 | 1/2006 | Brunel et al. |
| 2006/0046664 A1 | 3/2006 | Paradiso et al. |
| 2006/0066729 A1 | 3/2006 | Renkis |
| 2006/0070107 A1 | 3/2006 | Renkis |
| 2006/0070108 A1 | 3/2006 | Renkis |
| 2006/0075235 A1 | 4/2006 | Renkis |
| 2006/0095539 A1 | 5/2006 | Renkis |
| 2006/0143672 A1 | 6/2006 | Renkis |
| 2006/0165046 A1 | 7/2006 | Del Prado Pavon |
| 2006/0176834 A1 | 8/2006 | Dickerson et al. |
| 2006/0219776 A1 | 10/2006 | Finn |
| 2006/0279628 A1 | 12/2006 | Fleming |
| 2007/0005795 A1 | 1/2007 | Gonzalez |
| 2007/0009104 A1 | 1/2007 | Renkis |
| 2007/0075857 A1 | 4/2007 | Chang et al. |
| 2007/0199032 A1 | 8/2007 | Renkis |
| 2007/0236343 A1 | 10/2007 | Becksted et al. |
| 2007/0286144 A1 | 12/2007 | Miyake |
| 2009/0031966 A1 | 2/2009 | Kates |
| 2011/0169634 A1 | 7/2011 | Raj et al. |
| 2016/0035195 A1 | 2/2016 | Renkis |
| 2016/0073060 A1 | 3/2016 | Renkis |
| 2016/0094811 A1 | 3/2016 | Renkis |
| 2016/0174015 A1 | 6/2016 | Renkis |
| 2016/0335863 A1 | 11/2016 | Renkis |

OTHER PUBLICATIONS

Fleck, B, 802.11 Security, O'Reilly Publishing, Dec. 2002, Section 1.5 and 1.5.1.

How a Cell Phone Works, http://web.archive.org/web/19981206094029/http://howstuffworks.com/cell-phone.htm, 1998.

Langer. Mac OS X 10.2 Advanced: Visual QuickPro Guide, 2002. pp. 1-17.

Matsuyama, T. and Ukita, N. Real-Time Multitarget Tracking by a Cooperative Distributed Vision System. Proceedings of the IEE, vol. 90, No. 7, Jul. 2002. pp. 1136-1150.

Sony Intelligent Communication Color Video Camera EVI-G20, Sony Corporation. pp. 1-2. 1999.

Vicon Industries Inc., 'V905-Cube HD Mini-Cube Network Camera [installationguide]', Copyright 2013, Vicon Industries Inc., entire document, http://www.vicon-security.com/Collateral/Documents/English-US/Products/landO/V905-CUBE_Users_Manual.pdf.

\* cited by examiner

SURVEILLANCE MONITORING SYSTEMS AND METHODS FOR REMOTELY VIEWING DATA AND CONTROLLING CAMERAS

This application is a continuation application of U.S. patent application Ser. No. 10/977,762, filed Oct. 29, 2004, which application is incorporated by reference herein in its entirety.

REFERENCE TO RELATED APPLICATIONS

This application is related to the following non-provisional applications:

U.S. application Ser. No. 10/948,501, entitled "Wireless Video Surveillance System and Method With Two-Way Locking of Input Capture Devices," filed on Sep. 23, 2004.

U.S. application Ser. No. 10/949,487 entitled "Wireless Video Surveillance System & Method with DVR-Based Querying," filed on Sep. 24, 2004.

U.S. application Ser. No. 10/949,609 entitled "Wireless Video Surveillance System and Method with Emergency Video Access," filed on Sep. 24, 2004.

U.S. application Ser. No. 10/950,033 entitled "Wireless Video Surveillance System and Method with Remote Viewing," filed on Sep. 24, 2004.

U.S. application Ser. No. 10/949,489 entitled "Wireless Video Surveillance System and Method with External Removable Recording," filed on Sep. 24, 2004.

U.S. application Ser. No. 10/949,776 entitled "Wireless Video Surveillance System and Method with Dual Encoding," filed on Sep. 25, 2004.

U.S. application Ser. No. 10/955,552 entitled "Wireless Video Surveillance System & Method with Digital Input Recorder Interface and Setup," filed on Sep. 30, 2004.

U.S. application Ser. No. 10/955,825 entitled "Wireless Video Surveillance System & Method with Rapid Installation," filed on Sep. 30, 2004.

U.S. application Ser. No. 10/955,711 entitled "Wireless Video Surveillance System & Method with Input Capture and Data Transmission Prioritization and Adjustment," filed on Sep. 30, 2004.

U.S. application Ser. No. 10/955,444 entitled "Wireless Video Surveillance System and Method with Single Click-select Actions," filed on Sep. 30, 2004.

U.S. application Ser. No. 10/955,824 entitled "Wireless Video Surveillance System and Method with Security Key," filed on Sep. 30, 2004.

U.S. application Ser. No. 10/977,762 entitled "WIRELESS VIDEO SURVEILLANCE SYSTEM AND METHOD FOR MESH NETWORKING," filed on Oct. 29, 2004, which is incorporated by reference in its entirety.

U.S. application Ser. No. 14/931,506 entitled "WIRELESS VIDEO SURVEILLANCE SYSTEM AND METHOD FOR MESH NETWORKING," filed on Nov. 3, 2015, which is incorporated by reference in its entirety.

U.S. application Ser. No. 14/945,244 entitled "WIRELESS VIDEO SURVEILLANCE SYSTEM AND METHOD FOR MESH NETWORKING," filed on Nov. 18, 2015, which is incorporated by reference in its entirety.

TECHNICAL FIELD

The present invention relates generally to surveillance systems and, more particularly, to surveillance monitoring systems and methods for remotely viewing data and/or controlling cameras.

BACKGROUND

While video surveillance systems have existed in the prior art, typically they are wired devices that are difficult, time-consuming, and costly to install and operate. Also, generally, they do not provide for wireless systems that are secure from wireless interception or Internet enabled interception and permit remote user access for viewing, reviewing stored information, and controlling the system's components, in particular via Internet connection to a remote controller computer or cellular phone or other Internet connected device. Thus, there remains a need in the art for a wireless surveillance system and methods of operating same, providing simple setup and controls for high quality input capture by surveillance input capture devices (ICD), including but not limited to video inputs, and digital input recorder device(s) (DER) associated with the ICDs, the DIRs data transfer, storage, and control, including systems and methods providing for remote viewing and controls of the ICDs and DIRs via a remote server computer (RSC) and/or Internet access through the RSC.

Examples of prior art may include:

U.S. Patent Application Publication No. 20040105006 published Jun. 3, 2004 for Lazo, et al. assigned to Sensormatic Electronics Corp. for EVENT DRIVEN VIDEO TRACKING SYSTEM, teaches a system that tracks and electronically identifies assets from surveillance zone to surveillance zone within a controlled area is provided. A triggering event, which can be the output of an RFID reader, or other event, initiates video tracking of the asset that is associated with the RFID tag or other trigger. The video surveillance continues from zone to zone, as the image of the asset is handed-off from camera to camera. The image of the asset can be selectively displayed and recorded, along with the identity of the asset. The system is flexible and programmable for use in a plurality of different environments and surveillance zones, using a plurality of different triggering sensors and video cameras.

U.S. Patent Application Publication No. 20040136388 published Jul. 15, 2004, for Schaff, for VIDEO-MONITOR/RECORDING/PLAYBACK SYSTEM, describes a stand-alone video recording, playback and Monitoring system. It has network switches, non-volatile storage devices, IP cameras, video servers, and NTSC cameras. The system uses communication channels that are WAN/LAN based and can be hard-wired or wireless.

U.S. Patent Application Publication No. 20020186180 published Dec. 12, 2002, for Duda, William, for HANDS FREE SOLAR POWERED CAPNISOR INTEGRATED WIRELESS MULTI-MEDIA APPARATUS, describes an apparatus whereby the functional electronics components of popular consumer communications and entertainment products can be repackaged in a molded plastic module that would be mounted underneath and follow the contour of the visor of a head wearable cap/visor providing the user with a hands free, continuous power, virtually invisible multi-media capability. The module would feature, a drop down visual display, drop down camera lens for low resolution digital photography, rechargeable battery, stereo speakers and earphones, a microphone and microphone boom, manual push button controls and LED indicator lights, input/output jacks, and an interactive voice capability. A flexible solar cell and antenna would be mounted on the upper surface of the head wearable cap/visor providing the wireless link and continuous power to the electronics module. All components would be secured to the head wearable cap visor via two active pins that protrude from the upper surface of the electronic module, pierce the visor, and mate up with the solar cell and antenna on the upper surface of the visor.

U.S. Patent Application Publication No. 20020026636 published Feb. 28, 2002, for LeComte, for VIDEO INTERFACING AND DISTRIBUTION SYSTEM AND METHOD FOR DELIVERING VIDEO PROGRAMS, describes a video interfacing arrangement for connecting at least one display device to at least one video source composed of a module including a dedicated and programmed digital processing unit adapted to decode and descramble video flow according to a preloaded decoding or descrambling program, in order to display, in real time or delayed in time, to store, to record and/or to send over a telecommunication network, and on at least one screen interface, at least one storage or recording interface, a local or wide area network connecting interface and a user communication and controlling interface, the interfaces being linked to and driven by the processing unit and preferably mounted in or on the module. The invention also concerns a distribution system and a method for transferring encoded video programs and sequences over a wide area network.

U.S. Pat. No. 6,335,742 issued Jan. 1, 2002, to Takemoto, for APPARATUS FOR FILE MANAGEMENT AND MANIPULATION USING GRAPHICAL DISPLAYS AND TEXTUAL DESCRIPTIONS, describes a processor-based display processing apparatus, method and user interface allows for easy understanding of the contents of respective files by present a portion of the respective files as a graphics image along with other associated attributes of the respective files. A computer readable recording medium with a program recorded therein is provided for enabling a computer to function as the apparatus and perform the method. In the display processing apparatus, when an operator selects a folder from a folder display area on a browser screen, a processor controls the selected folder to be identified and displayed, and graphics images of image files contained in the selected folder are displayed in a predetermined display area.

U.S. Patent Application Publication No. 20040008255 published Jan. 15, 2004, for Lewellen, for VEHICLE VIDEO SYSTEM AND METHOD, describes a vehicle video system includes a small camera in the passenger area that uses illumination in the non-visible spectrum to illuminate the passenger area. The vehicle video system records video information on a digital video recorder that uses digital media such as a hard disk drive, recordable CD (CD-R), rewritable CD (CR-RW), or writable Digital Video Disc (DVD). The vehicle video system includes a local wireless interface, such as a Bluetooth-compatible interface, that automatically connects to a compatible device in the parking area of the vehicle that is coupled to a database. In this manner, the digital video information collected by the vehicle video system is automatically transferred to the database when the vehicle is parked, removing the need for any human intervention for the logging and cataloging of video tapes. The local wireless interface of the vehicle video system also allows other devices, such as a handheld device or a vehicle video system in a different vehicle, to access the stored digital video information.

U.S. Patent Application Publication No. 20040165546 published Aug. 26, 2004, for Roskind, for TIME BASED WIRELESS ACCESS PROVISIONING, describes a method and apparatus for the time-based provisioning of wireless devices. A network access point monitors operation of wireless devices within a service region. When provisioning logic is activated at the network access point, the access point determines if the tracked parameter (such as power on or the onset of signal transmission) of the wireless device occurs within a designated time interval from the time of the provisioning activation. If the tracked device qualifies, the network access point proceeds with provisioning the device. In one system embodiment, the network access point tracks the power on time of wireless devices. When a wireless device to be authorized is powered on, the provisioning logic at the network access point notes the power on time. The user then activates the provisioning access at the network access point, and the network access point provisions the wireless device if it is recently powered on.

U.S. Patent Application Publication No. 20030188320 published Oct. 2, 2003, for Shing, for METHOD AND SYSTEM FOR A DISTRIBUTED DIGITAL VIDEO RECORDER, describes a system and method, for remote display and control of an audio/video data stream from a capture device, e.g., a TV capture card, audio/visual capture card or digital camera capture card in a PC. In an exemplary embodiment there are some components of a software DVR player executing on at least one client device and other components on at least one server device. Users can view and/or control the audio/video data from a server device, having a capture device, on client devices located anywhere as long as they are connected to the server through a network. In addition, a server device with a capture device can support display of the video data at multiple client devices at the same time.

U.S. Patent Application Publication No. 20020188955 published Dec. 12, 2002, for Thompson et al., for DIGITAL VIDEO RECORDING AND PLAYBACK SYSTEM FOR TELEVISION, describes a system and apparatus for digitally recording and playing back videos from either an Internet website or a TV broadcast or cablecast is disclosed herein. The system comprises a set-top box, along with the necessary cables and remote control units, that connects between a television set and an Internet hook-up and allows a viewer to digitally record TV shows and/or download video from the Internet and store said video on the set-top box's hard drive for later viewing (using video encoding technology). In addition to the recording and playback capabilities, the disclosed system allows the viewer to pause, rewind, slo-mo, and instant replay live television without videotapes or VCR programming.

U.S. Patent Application Publication No. 20040168194 published Aug. 26, 2004, for Hughes, for INTERNET TACTICAL ALARM COMMUNICATION SYSTEM, describes an Internet tactical alarm communication (ITAC) system includes at least one sensor, at least one video camera, and an ITAC computer delivery unit, wherein the at least one sensor, the at least one video camera, and the ITAC computer delivery unit are communicatively interconnected, and the ITAC system provides real-time data regarding a particular condition.

U.S. Patent Application Publication No. 20020100052 published Jul. 25, 2002, for Daniels, for METHODS FOR ENABLING NEAR VIDEO-ON-DEMAND AND VIDEO-ON-REQUEST SERVICES USING DIGITAL VIDEO RECORDERS, describes a near video-on-demand (VOD) service enabled using a digital video recorder (DVR) for the simultaneous storage and playback of multimedia data. A DVR is connected over a network to a multimedia network source. A VOD selection is requested by the DVR from the network source. A multimedia data signal is received by the DVR from the network source. The data signal contains the requested VOD selection. A first received portion of the received data signal is stored on the DVR. The first received segment is played by the DVR for display on a display device. Simultaneously during the playing of the first received segment, a second received segment of the received data signal is received from the network source and stored on the DVR while the first received segment is played the display device. Thus, the requested VOD selection begins playing on the display device prior to the reception of the entire compressed multimedia data signal so that a requested VOD selection can begin being displayed nearly instantaneously after the request for it is made. A video-on-request (VOR) service is also enabled using a DVR. VOR selection data is received by a centralized database device, such as a network server, from a plurality of users. Each VOR selection data includes at least one requested video selection and video recorder identifying information for identifying each particular video recorder. A transmission priority of requested video selections is determined dependent on the frequency of requests received from the plurality of users. A transmission channel and time is determined based on the transmission priority. DVR control signals are transmitted to automatically tune in the determined transmission channel at the determined transmission time and record the particular video selection.

SUMMARY

The present invention is directed to a wireless surveillance system and methods of operating same, providing simple setup and controls for high quality input capture by surveillance input capture devices (ICDs) that are capable of cross-communication with each other, including but not limited to video inputs, and digital input recorder device(s) (DIR) associated with the ICDs, the DIRs data transfer, storage, and control, more particularly, the present invention is directed toward a method for controlling communication between ICD(s) and corresponding DIR. The present invention is further directed toward systems and methods providing for remote viewing and controls of the ICDs and DIRs via a remote server computer (RSC) and/or Internet access through the RSC, the systems and methods having controllable communication between the ICD(s) and corresponding DIR.

In a preferred embodiment, there is at least one ICD associated with a corresponding DIR for providing a system for capturing inputs of a target environment via the at least one ICD and transferring those inputs via two-way controllable wireless communication with the DIR for electronic, digital storage and remote access thereof. In another preferred embodiment, the system further includes an RSC, which is directly or Internet-remotely accessed by at least one authorized user of the system, when control settings permit. Such controllable remote access includes user viewing of captured inputs of the target environment, including live and/or historical/recorded data, storing, editing, retrieving or otherwise reviewing said inputs, and controlling the system settings and activities, and combinations thereof.

The present invention is further directed to a method for installing and operating the system and various embodiments and combinations thereof.

Thus, the present invention provides systems and methods for wireless surveillance of predetermined environments, in particular with remote access and controls of the system components.

Accordingly, one aspect of the present invention is to provide a system for surveillance of a predetermined environment having at least one wireless input capture device (ICD) and a corresponding digital input recorder (DIR) for receiving, storing, editing, and/or retrieving stored input from the at least one ICD and controlling the ICD via wireless, remote communication therewith.

Another aspect of the present invention is to provide a system for surveillance of a predetermined environment having at least one wireless input capture device (ICD) and a corresponding digital input recorder (DIR) for receiving, storing, editing, and/or retrieving stored input from the at least one ICD and controlling the ICD, and a remote server computer (RSC) for providing at least one authorized user remote, wireless access to the at least one ICD and DIR, where the ICD, DIR, and RSC are in wireless digital communication with each other and where the RSC may be accessed directly by the user or through the Internet.

Still another aspect of the present invention is to provide methods of using the system embodiments set forth herein, such as a method for locking communication between at least one wireless input capture device ICD(s) and a corresponding digital input recorder (DIR), including the steps of providing base system; at least one user accessing the DIR via user interface either directly or remotely; the DIR searching for signal from the ICD(s) and establishing communication with them; and locking the ICDs to send wireless data exclusively to that DVR; and/or the DVR locking itself for exclusive communication with the locked ICDs, thereby providing a secure surveillance system for a target environment.

These and other aspects of the present invention will become apparent to those skilled in the art after a reading of the following description of the preferred embodiment when considered with the drawings.

DETAILED DESCRIPTION

Figure 1:
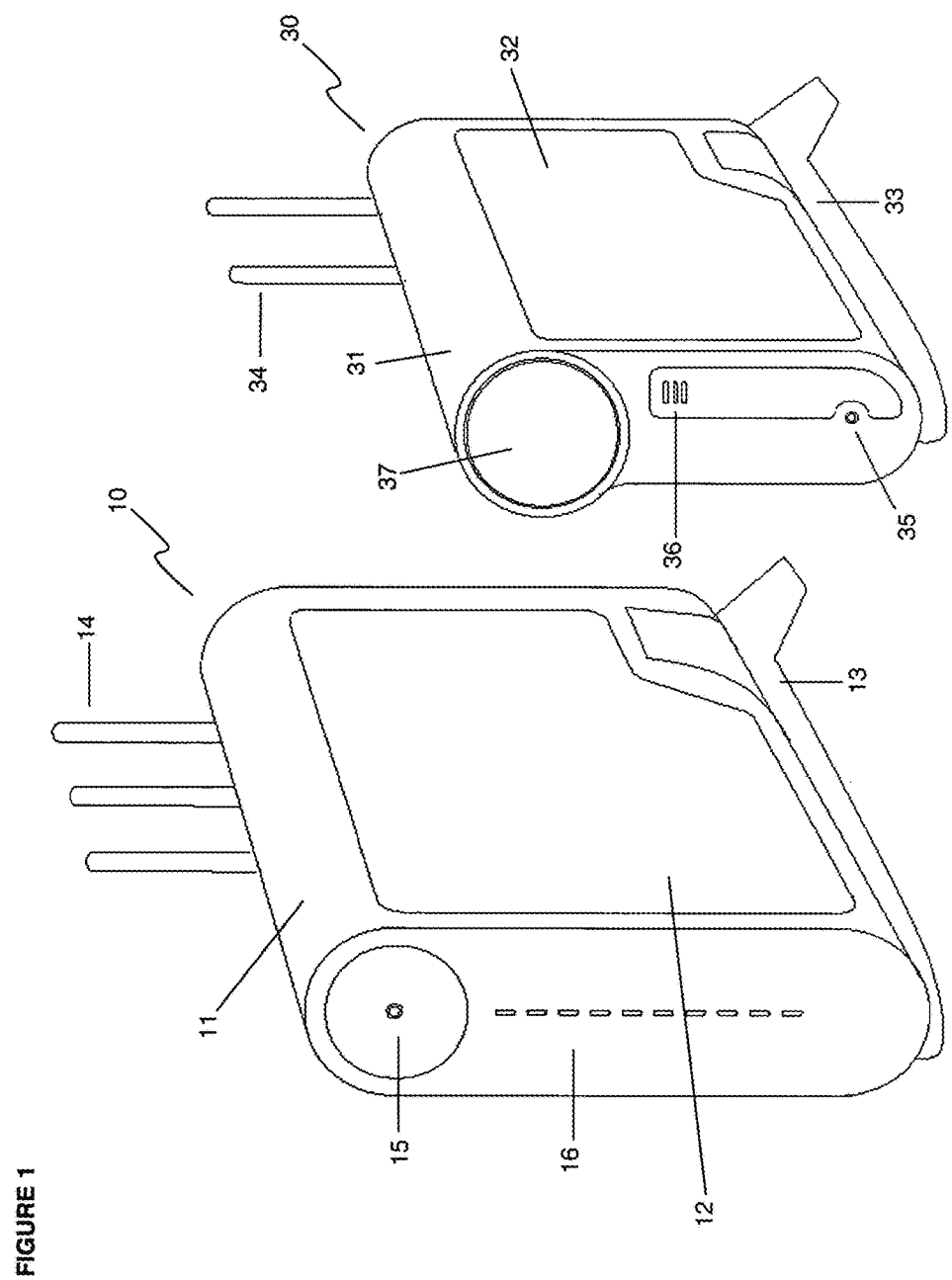
FIG. 1 is a perspective view of one embodiment constructed according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. As best seen in FIG. 1, the two base elements of a system constructed according to the present invention are shown side-by-side, including a wireless input capture device and a corresponding digital input recorder.

FIG. 1 shows a perspective view of one embodiment constructed according to the present invention, showing an input capture device ("ICD"), generally referred to as 30, and a digital input recorder ("DIR"), generally referred to as 10, juxtapositioned. The DIR 10 has a plastic case 11 with a metal plate 12 affixed thereto and a removable tilt adjustable base 13 removably attached to the bottom of the DIR. Antennas 14, near the top of the DIR provide wireless communication for the present invention. A green power led and button 15 is near the top of the DIR. The button 15 can turn on the motion detection and/or record all functions of the present invention. The status indicator LEDS 26 are placed on the front of the DIR and can illuminate either red or green.

Similarly, the ICD 30 has a plastic case 31 with a metal plate 32 affixed thereto and a removable tilt adjustable base 33 removably attached to the bottom of the ICD. Antennas 34, near the top of the ICD provide wireless communication for the present invention. A power/motion detection LED 35 is positioned near the bottom of the front of the ICD and can illuminate either red or green. A microphone 36 is also positioned on the front of the ICD to detect sound. The camera lens 37 is positioned near the top front of the ICD.

Figure 2:
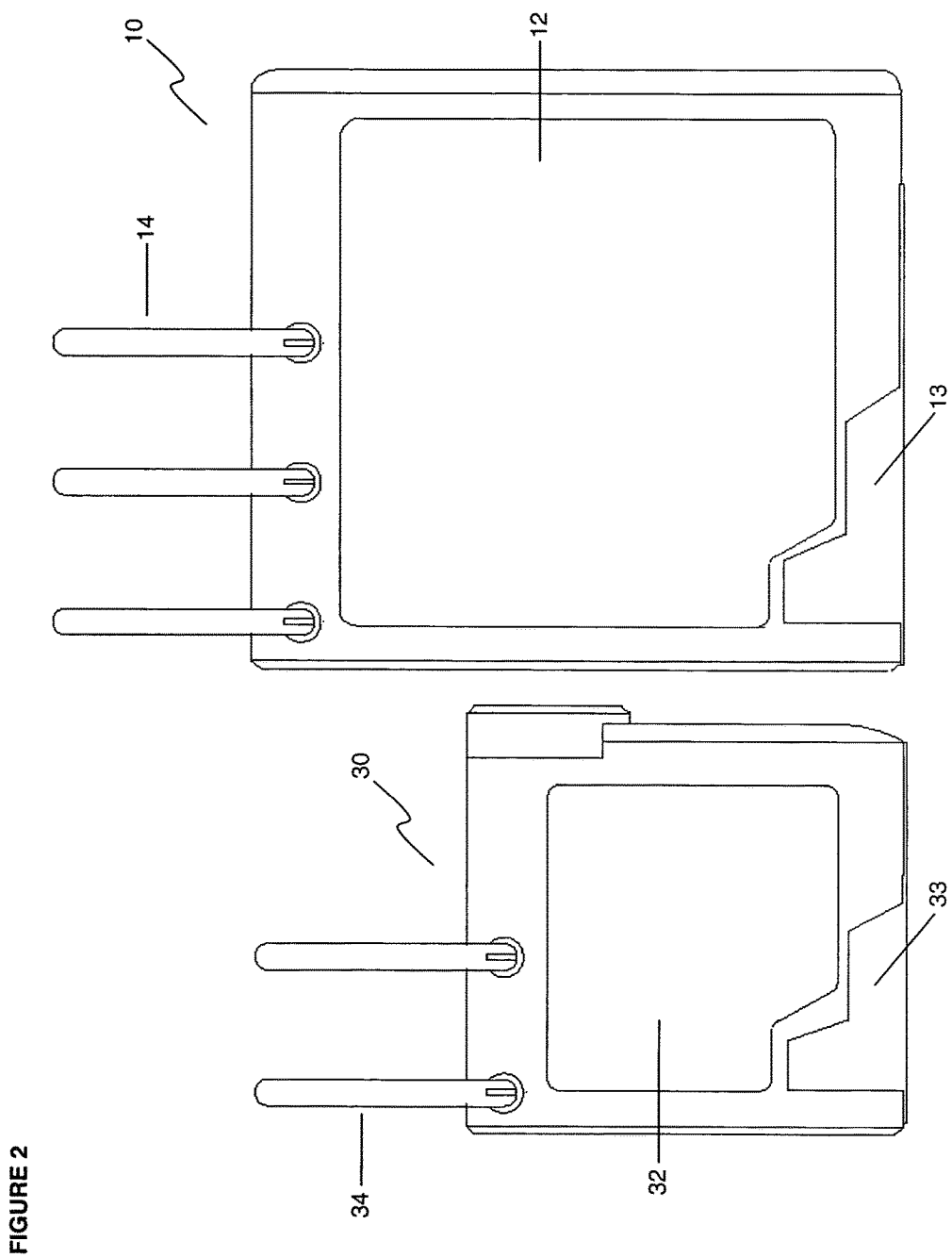
FIG. 2 is a side view of the embodiment shown in FIG. 1.

FIG. 2 shows a side view of the embodiment shown in FIG. 1, showing an ICD 30 and a DIR 10 juxtapositioned.

Figure 3:
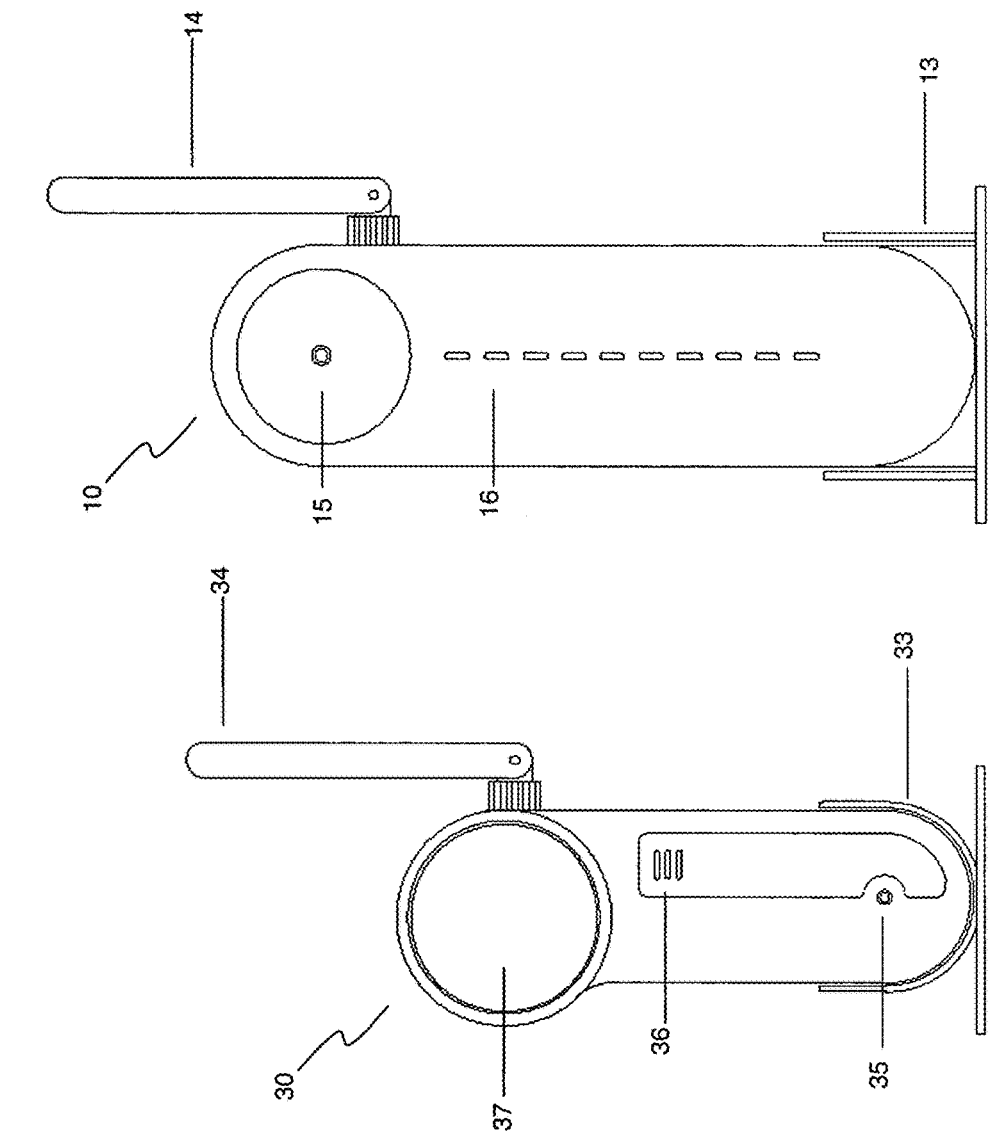
FIG. 3 is a front view of the embodiment shown in FIG. 1.

FIG. 3 shows a front view of the embodiment shown in FIG. 1, showing an ICD 30 and a DIR 10 juxtapositioned.

Figure 4:
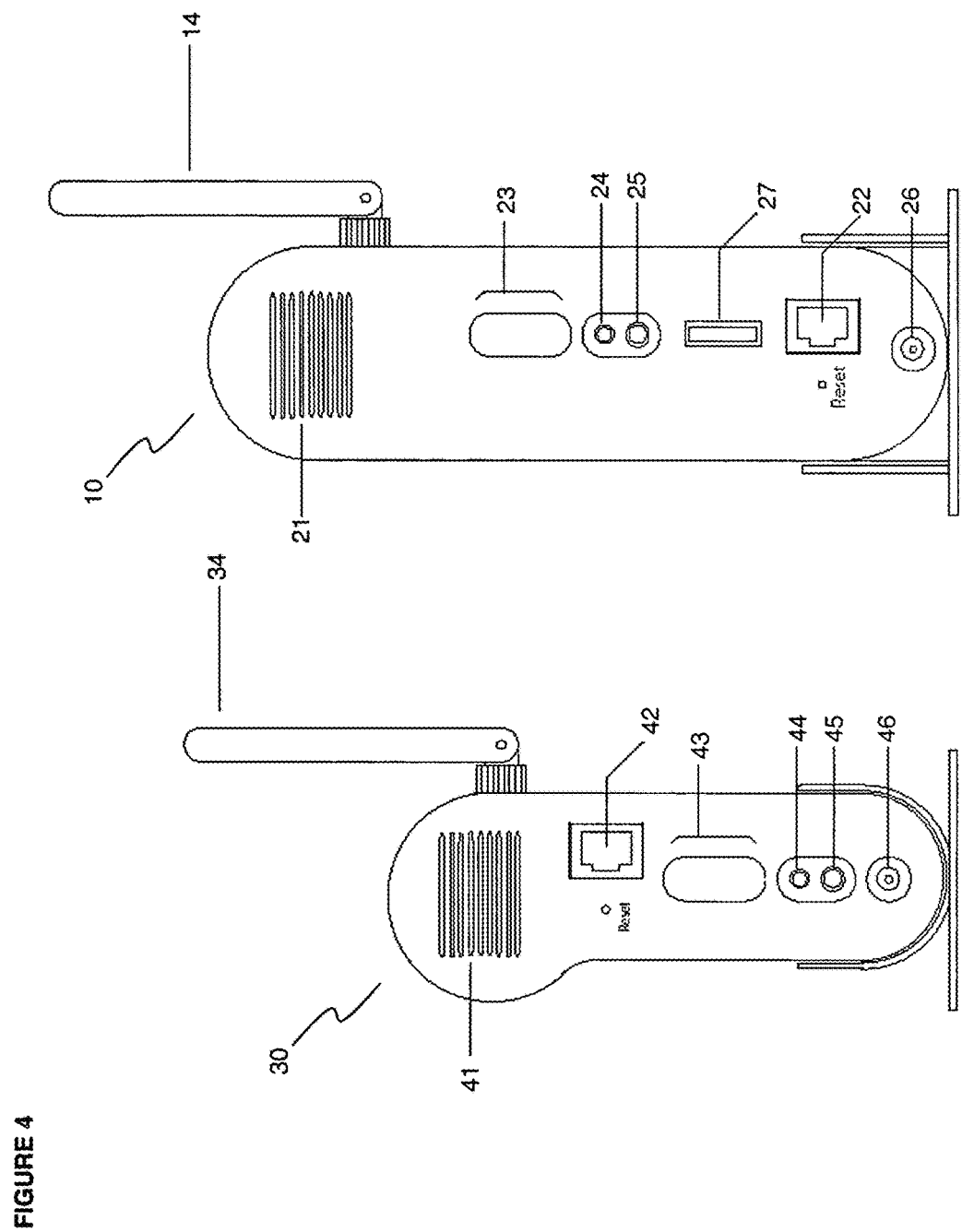
FIG. 4 is a back view of the embodiment shown in FIG. 1.

FIG. 4 shows a back view of the embodiment shown in FIG. 1, showing an ICD 30 and a DIR 10 juxtapositioned. The ICD 30 has air vents 41 to facilitate cooling of the device. FIG. 4 also illustrates the various ports that are available on the two devices. The ICD 30 has the following ports: RJ-45 42; Alarm I/O Out 43; Microphone In 44; RCA Video Out 45; and DC In 46.

Similarly, the DIR 10 has air vents 21 to facilitate cooling. Some of the ports may differ between the ICD and DIR. The DIR 10 has the following ports: RJ-45 22; Alarm I/O Out 23; Audio Out 24; RCA Video Out 25; DC In 26; and USB 27.

Figure 5:
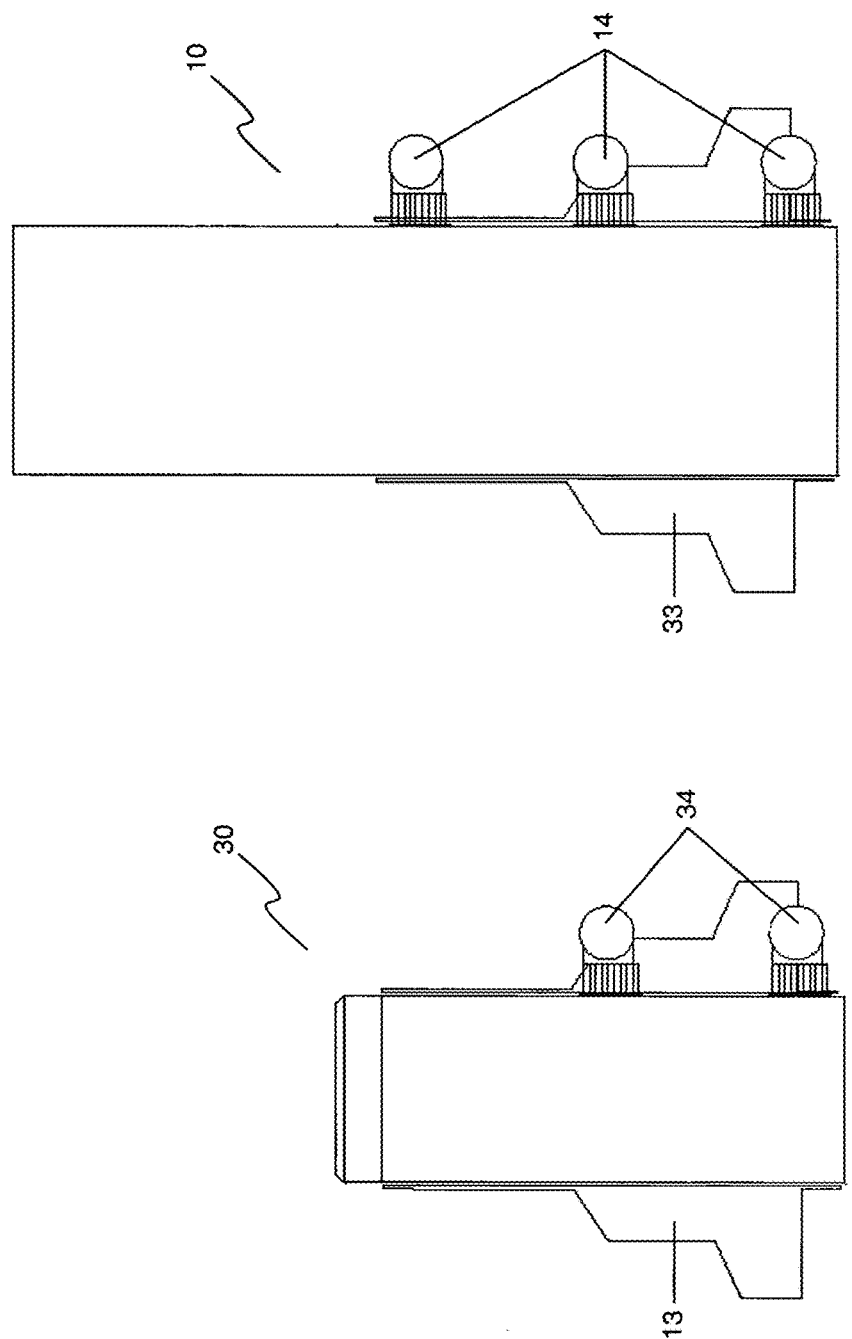
FIG. 5 is a top view of the embodiment shown in FIG. 1.

FIG. 5 shows a top view of the embodiment shown in FIG. 1, showing an ICD 30 and a DIR 10 juxtapositioned. This demonstrates the possible footprints of the devices.

Figure 6:
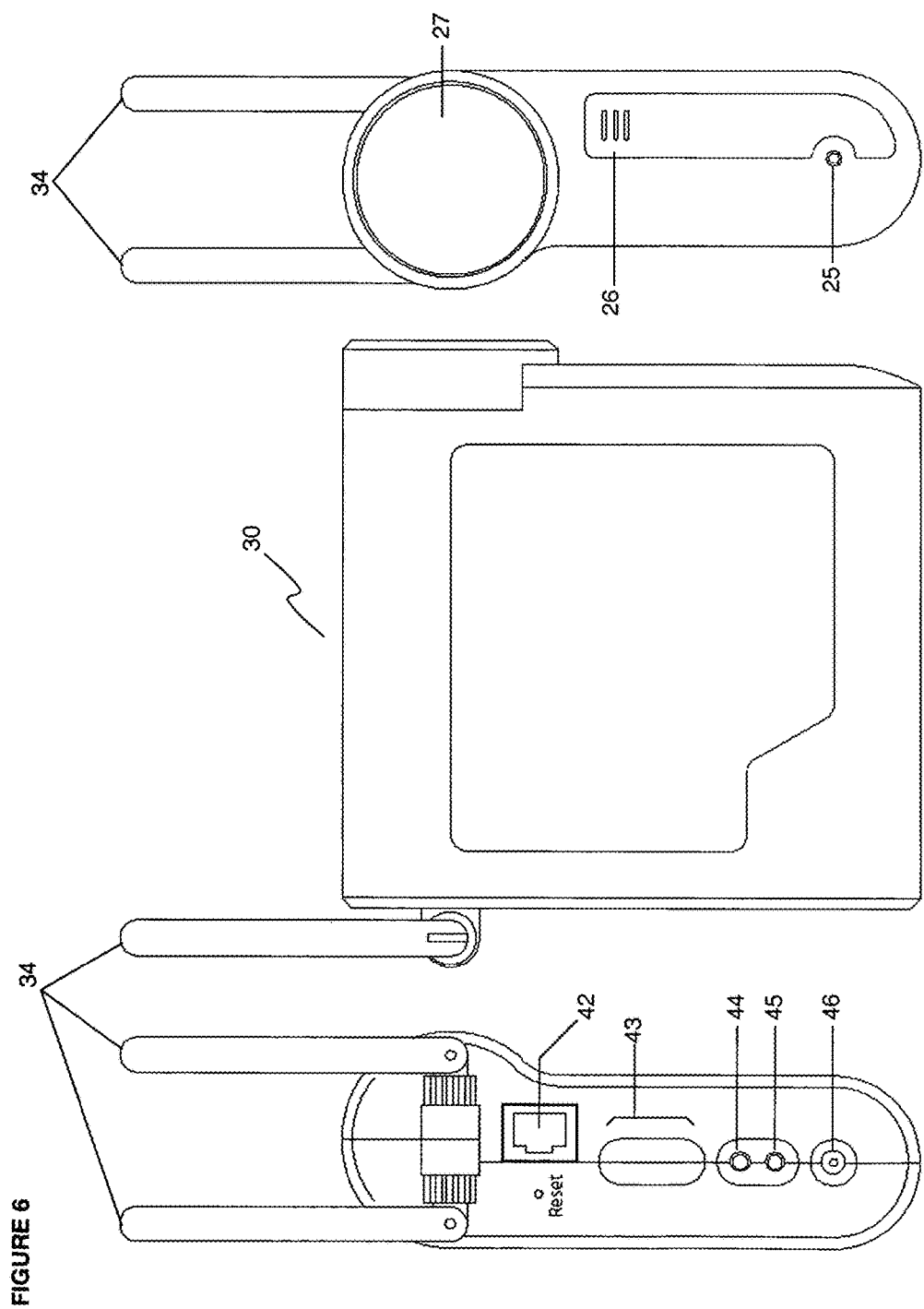
FIG. 6 is a bottom view of the embodiment shown in FIG. 1.

FIG. 6 shows a back, side, and front view of an alternative embodiment of the ICD 30 component of FIG. 1. The ICD 30 is similar to that previously described except the air vents 41 have been removed and the antennas 34 have been positioned to the back of the ICD. Additionally, FIG. 6 illustrates the ICD with the removable tilt adjustable base 33 removed.

Figure 7:
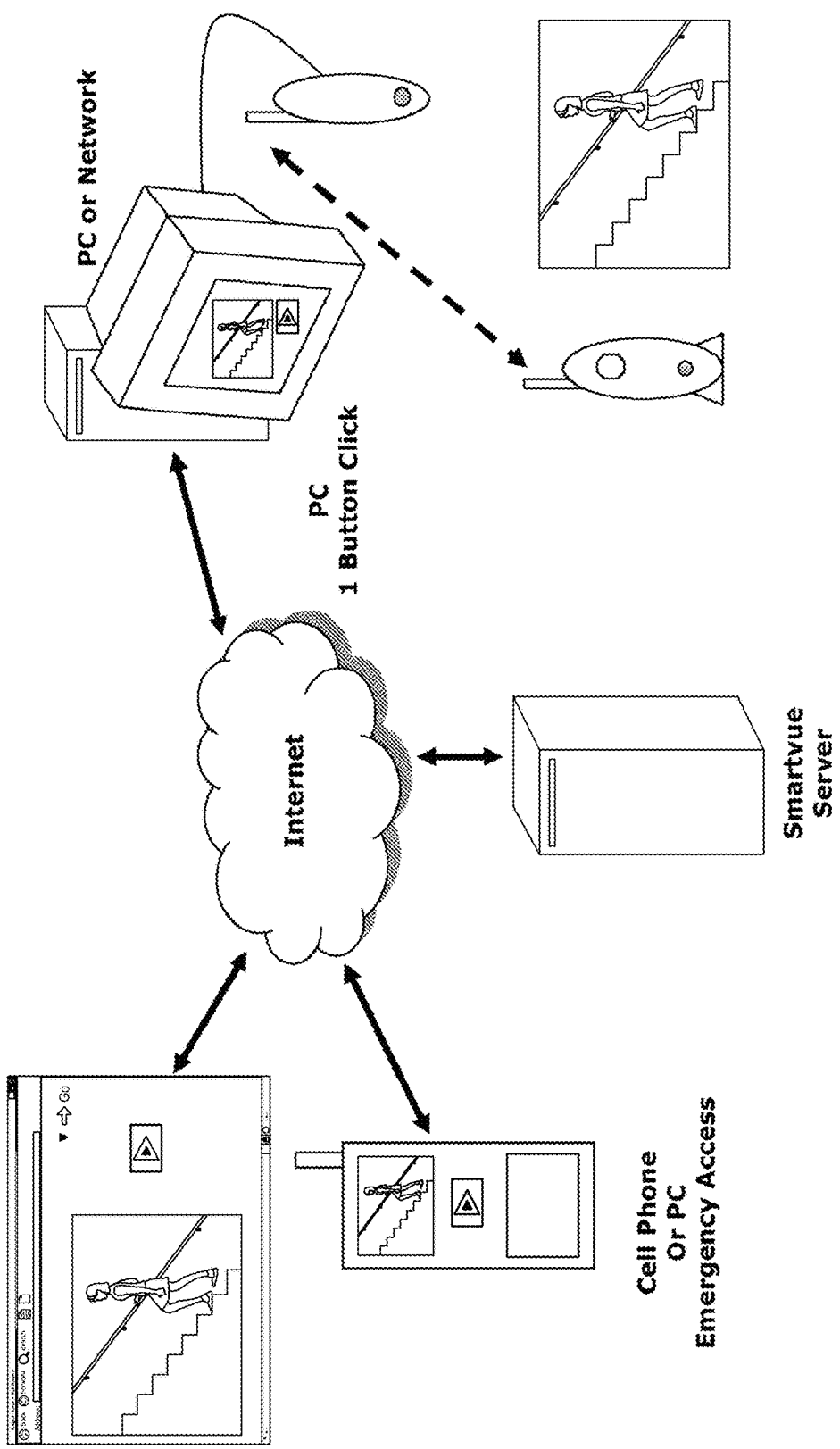
FIG. 7 is a schematic showing the interconnection of remote units of the system.

FIG. 7 shows a schematic showing the interconnection of remote units of the system.

Figure 8:
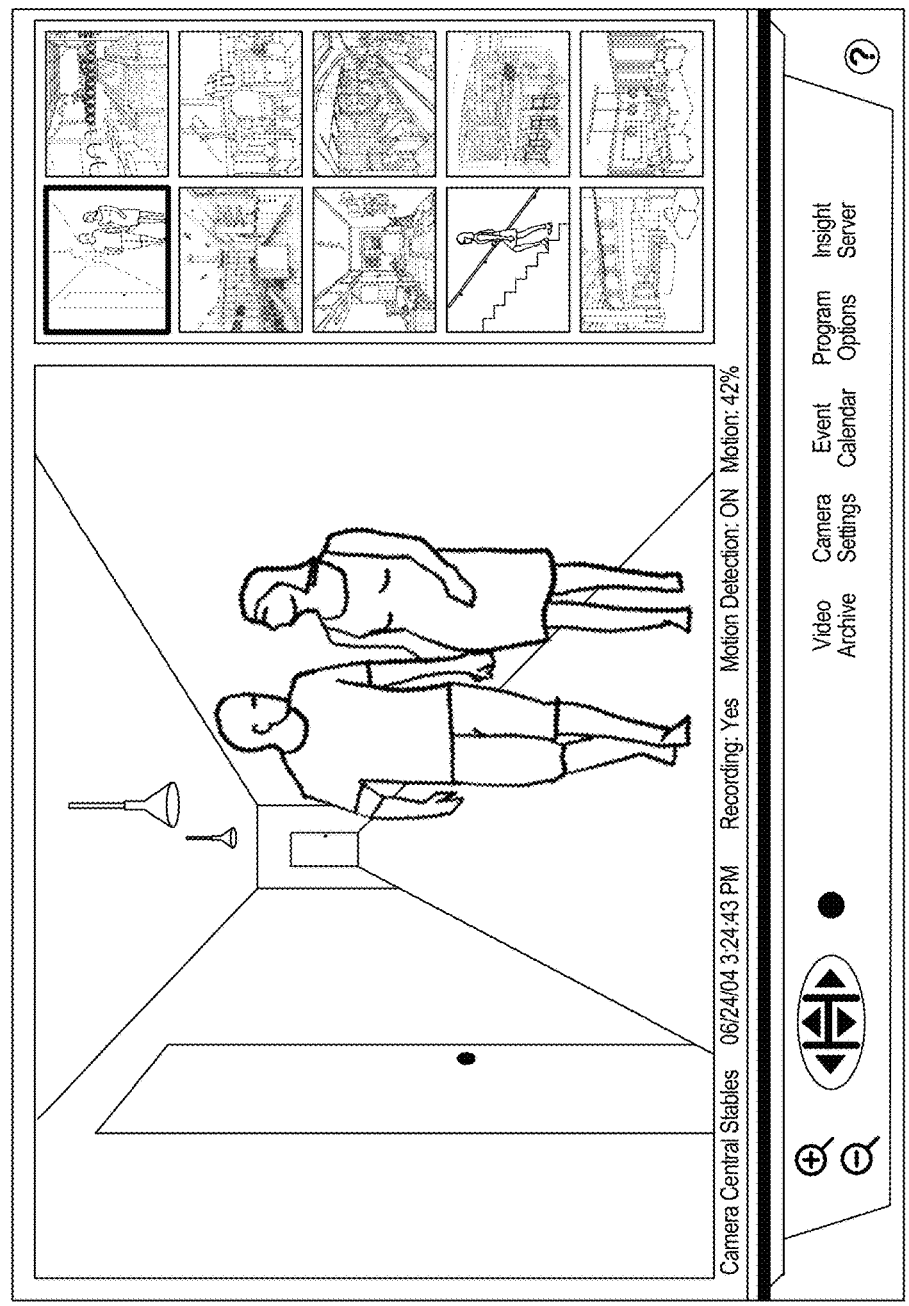
FIG. 8 is a user interface view of inputs to the system viewable by a user.

FIG. 8 shows a user interface view of inputs to the system viewable by a user.

Figure 9:
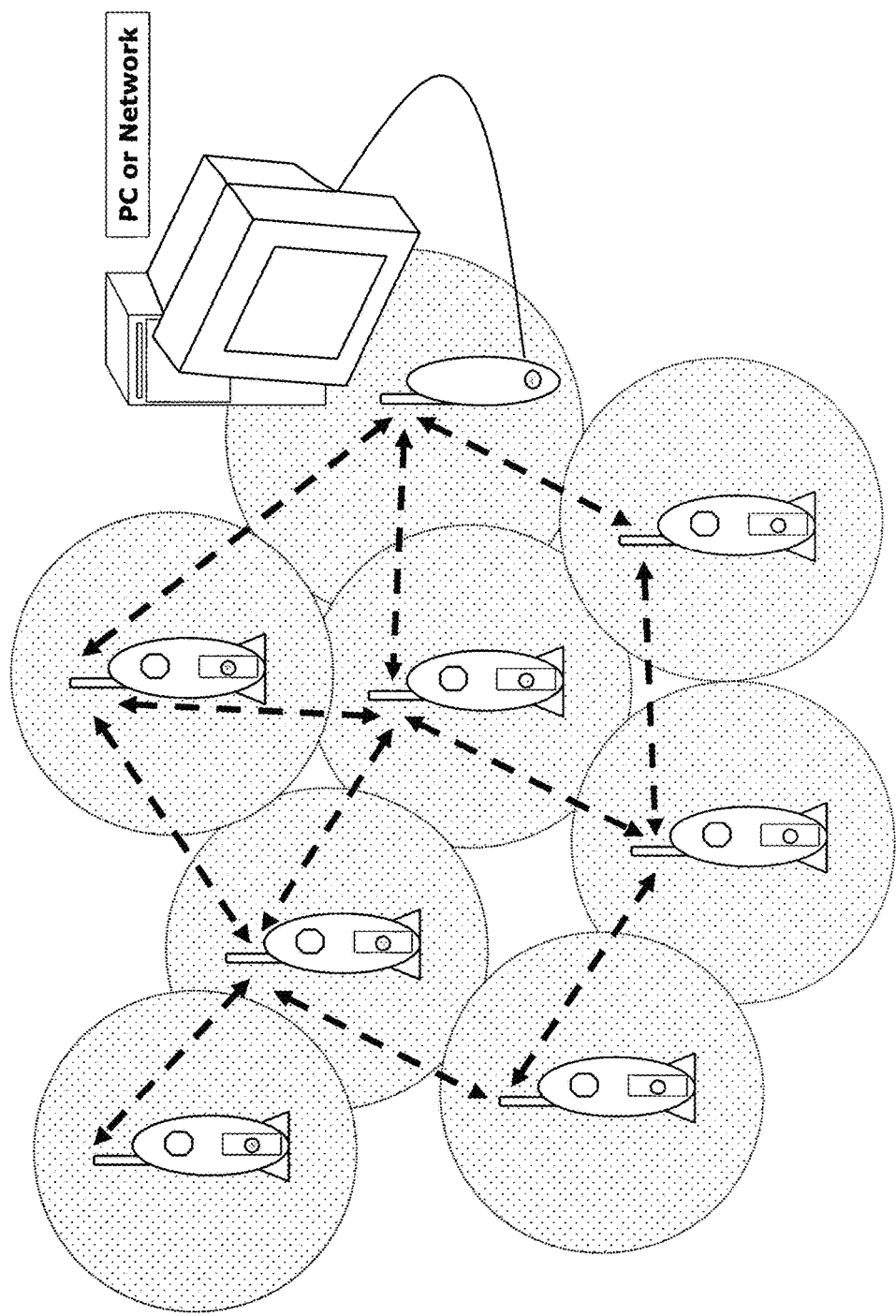
FIG. 9 is a schematic showing communication between ICDs that then communicate with a DIR that then communicates with a RSC.

FIG. 9 shows one mesh networking scheme according to the present invention. In one embodiment, ICDs communicate with each other to 1) extend the range of the ICDs, so they transmit data to pass down the line to the receiver, extending the range by the number of cameras and 2) cameras communicate with each other based on set rules and decide themselves when an issue should be made aware of to the DIR or RSC. By way of example, one camera can alert another camera if it picks up a fast moving person who is running towards that camera; if a person should not be at that camera, it can then alert the DIR or RSC.

Alternatively, ICDs can communicate with each other to exchange RFID data that each ICD receives and then, based on rules that each camera has, act on that data. By way of example, if an ICD detects a person who has an RFID tag, the ICD can also detect that person's RFID data and compare it to a database to determine if that person has permission to be at a certain location. Furthermore, the system also can track a person's movement. If a person appears with the incorrect RFID tag or no RFID tag, then an alarm can be sent to other ICDs and/or the DIR which can in turn communicate with the RSC.

Figure 10:
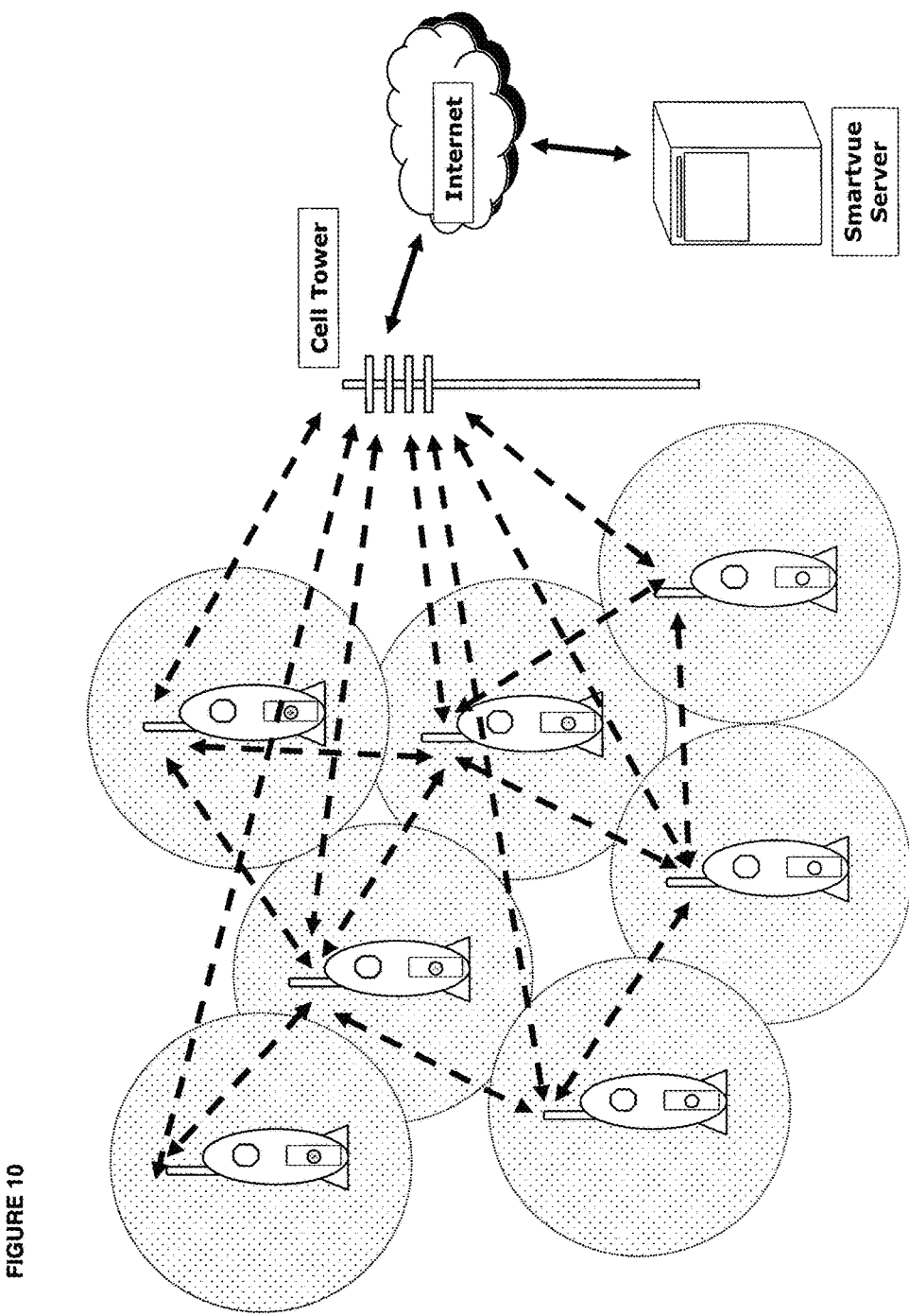
FIG. 10 is a schematic showing communication between ICDs that then communicate to a cell tower which then communicates to a RSC via the internet.

FIG. 10 shows another mesh networking scheme according to the present invention. In one embodiment, ICDs communicate with each other based on set rules and decide themselves when an issue should be made aware of to RSC via a cellular connection. The ICDs send data to one another and in an alternate configuration just send data to the RSC via the cell tower and the RSC sends data back to each ICD. By way of example, one camera can alert another camera if it picks up a fast moving person who is running towards that camera; if a person should not be at that camera, it can then alert the RSC.

The wireless surveillance system according to the present invention includes at least one wireless input capture device (ICD) for sensing, capturing and transmitting surveillance inputs from a predetermined input capture location, and a digital input recorder device (DIR) for receiving the surveillance inputs from the at least one wireless ICD and storing those inputs, which are capable of being reviewed by a system user on a controller/server computer, wherein the server computer is optionally used for communication with the ICDs and DIRs. In one embodiment of the present invention, the at least one ICD and corresponding DIR device are used to form the system without requiring a separate server computer. The DIR itself has full capabilities when arranged for communication wirelessly with ICDs for recording and controlling inputs to the system, as well as settings for each of the at least one ICD, including activation of each.

Input Capture Device(s) (ICDs)

On the front end of the system, the at least one wireless ICD further includes a power source, a power converter; soft power down component which provides for a gentle power down so that ICD settings are preserved and not lost. Preferably, while the ICD is wireless, it further includes an optional network connection at a back side of the ICD also, so it can be hardwired into a network.

The ICD also includes at least, one sensor and at least one input component for detecting and recording inputs, a processor, a memory, a transmitter/receiver, and optionally, at least indicator light for indicating camera activities, all constructed and configured in electronic connection. By way of example and not limitation, the at least one input component may include a microphone, and/or a camera. In one preferred embodiment of the present invention, the at least one wireless ICD includes two antennas for providing a wireless signal for receiving and/or transmitting data with the DIR device or another ICD(s). The ICDs are operable for cross-communication with each other, including data exchange, wherein the data exchange includes information about the surveillance environment, settings, inputs, and combinations thereof. The at least one wireless ICD further includes a housing having a removable casing around the lens to make lens adjustments or settings; ICD adjustments and settings are preferably optional, and are not usually required in preferred embodiments of the present invention, as the DIR device automatically establishes and controls the ICD settings and activities for each of the at least one wireless ICDs associated with the particular DIR device.

For the preferred embodiments where the ICD includes a digital video camera (DVC) having a lens and corresponding camera components, the camera further includes a computer chip providing for capabilities of performing video compression within the ICD itself. The ICD as a wireless digital video camera is capable of capturing video within its range within the surveillance environment and compressing the captured video into a data stream, the capture occurring at predetermined dates and times, during activity detection, and/or on command from the wireless DIR associated therewith. In the case of video, the images are adjustable to capture at different sizes, different frame rates, and/or to include the display of the name of the device (determined by the user and/or the system), the date, the time, and combinations thereof. The ICD including a DVC is capable of capturing images that are combinable and/or integratable with the video data stream and/or compressible into an individual image data stream, all at predetermined dates and times, when activity such as motion or audio are detected, on command from the wireless DVR, and combinations thereof. As with video capture, image capture is adjustable to capture at different sizes, different frame rates, and/or to include the display of the name of the device (determined by the user and/or the system), the date, the time, and combinations thereof. A data stream of images is transmittable wirelessly to the wireless DVR.

Similarly, where the at least one ICD has audio capabilities, the captured audio, which is combinable and/or integratable with other inputs captured by the ICD sensors, is compressible into an individual audio data stream, which is transmittable wirelessly to the DIR. The activity of audio ICD is activatable at predetermined dates and times, during activity detection, and/or on command from the wireless DIR associated therewith. The audio ICD is further adjustable to capture audio at different or variable rates.

Preferably, since the ICD generates heat during operation, the ICD housing includes a cooling system having a vent and a low noise cooling fan. Since the video components of ICDs generate heat that must be dissipated for optimal performance of the system, preferred embodiments of the present invention include housing units with components that operate at lower temperatures, i.e., which generate less heat during operation, and include housing units formed of materials that dissipate heat well, and may include a combination of materials, such as metals and synthetic plastics or composites. While ICDs are preferably used for indoor applications, waterproofing and weather proofing housing units and other components for sealing the housing against water and weather are used for outdoor applications of the present invention. By way of example, sealed or gasketed casing, weatherproof venting and fan components to prevent water blowing into or being sucked into the case, are used for outdoor ICD units.

Other components optional to the housing unit but preferred for ease of use of the system include a removable filter collar on a front end of the camera lens, which facilitates user access for changing the filter and/or to provide a different filter, such as a polarization filter or a specialty filter, for example, to reduce light input or camera aperture.

The ICDs of the present invention are capable of detecting motion, capturing video, detecting and/or capturing audio, providing at least one data stream capability, including video, compressed video, audio, and combinations thereof. The at least one ICD is capable of capturing video, which is compressible into a data stream, and transmittable wirelessly to the DIR device, with the ICD audio data or other input data, such as temperature, humidity, chemical presence, radiation, and other input data, depending upon the sensors and intake means of each ICD, being combinable and/or integratable with the video data stream. Thus, while the ICDs each include at least one sensor for detection and at least one capture input means, preferably each of the ICDs include at least two sensors and input means for image and/or video, and audio capture. In a preferred embodiment, at least two sensor types are used, audio and image or video sensors. The at least one indicator is included with the ICD to indicate that the power is "on", and to indicate, that motion and/or audio being detected. The indicator is activatable when motion and/or audio is detected in a predetermined area and/or in a predetermined amount within the environment.

Each of the at least one ICDs is constructed for configuration that is capable of wireless communication (2-way) with the corresponding DIR device and/or any other ICD(s), which when configured provide a system for wireless electronic surveillance of an environment. In a preferred embodiment of the present invention, the ICDs are provided with multiple input multiple output (MIMO) wireless capability. Other wireless communication may be provided instead of MIMO.

Night vision for ICD video input capture may be provided using an infrared (IR) light source, so that the video recorded may be effective in low- to no-light conditions. Image or video input capture may be provided in a range of resolution, in black/white, in color, and sized based upon inputs from the DIR device and/or controller/server computer by an authorized user of the system, and are modifiable after setup of the system by modifying controls remotely, and/or by modifying hardware.

The ICD further includes at least one chip that makes the device an intelligent appliance, permitting functions to be performed by the ICD itself without requiring software installation or the DIR, including but not limited to sensor and input controls, such as camera digital zoom, pan left and right, tilt up and down; image or video brightness, contrast, saturation, resolution, size, motion and audio detection settings, recording settings, communication with other ICDs; and single chip video compression (single DSP). The CD also includes a sensor with ability for high dynamic range for inputs. Preferred embodiments of a system according to the present invention includes video technology commercially provided by MINI, and set forth under U.S. Pat. Nos. 6,791,611; 6,788,237; 6,778,212; 6,765,619; 6,737,626; 6,726,103; 6,693,575; 6,680,748; 6,666,012; 6,552,746; 6,545,258; 6,542,189; 6,518,909; 6,507,083; 6,498,576; 6,498,336; 6,452,152; 6,380,880; and 6,310,571.

The ICD further includes a stand to support the device; the stand may be included with, integral with, or attached to the housing. The stand is constructed and configured to be mountable to a wall, suspend from ceiling, and provide a variety of stable positions for the ICD to capture as much data from a given environment as appropriate, given the space, conditions, and input capture type desired. Importantly, the stand serves as a stable base to tilt the ICD for camera direction up and down, and/or side to side. The stand is movable between positions but retains a fixed position by a predetermined friction to ensure so that the ICD stays in place wherever the positioning was last stopped. The base and stand of the ICD is constructed such that it does not require mounting to a surface to provide stability. The adjustability and mobility of the device are significant features of the present invention to ensure optimal surveillance and easy setup.

Furthermore, the stand is weight balanced for good center of gravity to support the adjustment on the stand for stability on the entire range of motion for the ICD on its stand; since motion of the ICD is adjustable and provides for dynamic range of motion when the ICD is in use, the stand construction enables remote modification of settings without requiring the user of the system to readjust or optimize the ICD positioning in person.

The ICD preferably is constructed and configured for a range of coverage, which can vary depending upon the conditions and limitations of a particular target environment. In a preferred embodiment of the system, the ICD has a range of coverage with a target range of at least up to 250 ft. The ICDs are capable of having a range of up to 300 meters, with an active wireless range from 1-1000 ft linear feet indoors, and preferably greater. Advantageously, the ICD can be configured and activated quickly for quick start up of a surveillance system in the target environment. Additionally, the ICDs have the ability to communicate with one another to act as a data repeater and extend the usable wireless range to 3,000 meters and more.

Significantly, no adjustments to camera settings, such as focus and focal length, are required after camera installation; ICD settings are preadjusted and further controllable remotely by the DIR and/or RSC and/or other ICD(s). By contrast, in the prior art, adjustments are usually always required for surveillance cameras following installation. Preprogrammed settings may be provided, with automatic and remote adjustment capabilities. Where the ICD is a video camera, the settings may include focus, resolution, etc.

Each of the at least one ICD is constructed to optimally reduce heat from particular heat-generating components. In a preferred embodiment of the present invention, the ICD includes a plastic case with metal sides to reduce heat while the system is running. Also, a back plate of the ICD or camera is all metal to increase heat dissipation, and to optimize weight and heat management, which important where there is a lot of power involved, as with wireless video input devices. Also, significantly, the ICDs and/or DIR devices are constructed with a separate chamber for imaging components to reduce heat. It is known that heat is not good for imaging sensors or equipment; however, cooling fans can generate noise, which is preferably minimized with security systems and components therein. The camera is configured to communicate with an imaging board with a flexible electronics communication cable, which permits the camera to have a separate chamber for optimized heat reduction. This is a problem specific to wireless cameras that has not been successfully addressed in the prior art.

The ICD also includes at least one and preferably two antenna that are removable, including standard antennae, which may be substituted for a patch antenna and/or a long range antenna.

The inputs captured by ICDs are provided to the DIR for which output for RCA viewing is available, such as connecting a monitor with a user interface for remote viewing of video from video cameras. In this case the setup easier because the remote user can see what the camera views from the monitor, which is removably connectable to the system. The ICD and DIR also have an optional network connection at the back side, so the devices can be hardwired into the network, if appropriate; however, wireless connections are preferred.

Additionally, the ICDs have inputs, such as video and microphone, and at least one indicator light. In the case of a wireless video camera, the housing includes an easily removable casing around the lens to make lens adjustments or settings, which optional, and not usually required.

Additionally, the ICDs have the ability to communicate with one another to exchange data about the environment and all control settings and other settings of any other ICDs.

Digital Input Recorder Device (DIR Device)

The DIR is an optional component of the system where ICDs have smart microprocessing capabilities that enable data input capture, inputs processing and comparison with settings and/or reference data, and cross-communication with each other. However, where used, the wireless DIR device communicates directly with the at least one ICD, and, in embodiments where the controller/server is included in the system, the DIR device also communicates with the controller server to send data streams to the server and receive data or instruction from the controller/server to control its properties. In the case of a video camera for at least one ICD, the DIR may also be referred to as a digital video recorder device (DVR).

Surprisingly, compared with prior art surveillance systems, the DIR device and the smart ICDs function as appliances, which permits a rapid setup of the system. Significantly, since the DIR device operates as an appliance, there is no software installation involved in the basic system setup. The preferred embodiments of the present invention including at least one ICD and a corresponding DIR device permit for setup and recordation of inputs to the system from the observation or surveillance environment with one click activation by the user/installer, generally in less than ten minutes from start to finish. Such rapid setup, including installation and activation to recording of the system, is not possible with prior art systems, given their complex components, interactivity via transmission lines, and/or software installations, which typically require an expert or trained specialist to ensure proper setup, installation, activation, and testing of the system prior to ongoing operation. By sharp contrast, the preferred embodiments of the present invention provide for one click activation for receiving and recording inputs to the at least one wireless ICD, i.e., for activating the ICD capability to record designated dates and times, when a surveillance event, a motion event or an audio event is detected by at least one of the at least one ICDs in the system, immediately after the rapid setup is complete.

Furthermore, the system provides for rapid settings adjustment, including settings for sensitivity of ICD motion and audio detection; preferably, the settings adjustment is made by the user through the DIR device. The user simply sets a surveillance area for observation and data capture by each ICD of the at least one wireless ICD; for video capture, using an ICD with a digital camera, the camera may be set to focus on a predetermined location within the area, such as a window, a door, and the like. While the settings are practically a function of the ICD itself, the DIR device, which is also wireless, functions to control the settings of each of the corresponding ICDs associated with that DIR device. Other functions performed by the DIR device include, but are not limited to printing, saving or storing recorded inputs from the ICDs, transferring data to a removable storage device, such as a USB storage key device.

Also, a power supply and a soft power down function is provided, similar to the ICD soft power down, to preserve the settings of the DIR device in the event of power termination to the device.

The DIR is capable of running software for managing input from the at least one wireless ICD associated with or corresponding to a particular DIR device after installation. With the software, the DIR is capable of intaking and managing up to 10 data streams simultaneously; allowing the user to control the ICD unit, including allowing the user to zoom, pan, and tilt the camera, as well as managing microphone sensitivity. Sensitivity controls for other ICD input means, such as heat or temperature, chemical substance presence, radiation detection, and the like may be controlled remotely from the wireless DIR device as well. Other DIR device control functions for controlling the ICDs include but are not limited to controlling brightness, contrast, color saturation, where images and video are involved.

Other software-based functions capable of being performed by the DIR include sending text message, sending still image, sending email or other communication to a user on a remote communications device; usually, these functions are programmed to occur upon the occurrence of an event. DIR data recordation and storage overwrite may be based on settings that enable newer data to overwrite older data. Additionally, the DIR may be programmed to include overwrite protection to prevent overwriting of event video, audio, or other input data captured by the ICD and transmitted to the DIR device. Preferably, the DIR includes capabilities of data search and display, data archiving to external device, network, computer, server, and combinations thereof, data printing, data exporting, data deletion, data playback, and combinations thereof. Data playback includes play, fast forward, rewind or reverse, frame by frame step forward or backward, pause, and combinations thereof.

In a preferred embodiment of the present invention, the system includes a DIR device running software that is capable of automatically upgrading its own software, which eliminates user maintenance, upgrading, or other activity to optimize system performance.

The DIR's capabilities of adjusting settings and/or controls for the at least one ICDs includes any functions of the ICDs, including but not limited to zoom pan and tilt, color brightness, contrast, saturation, sharpness, frame rate, video and/or image size, audio rate, wireless control data, encryption and security data, set motion and/or audio detection area and/or levels, set recording, set triggers, record on command, and combinations thereof.

The DIR is preferably capable of connecting directly to a computer or a computer network, more specifically connecting to a personal computer via a USB or similar connection and to a network using a network cable or similar connector, with the DIR interface being accessible after such connection through a user interface or a web browser, respectively; and capable of sending data and/or alert or warning to a cell phone or computer via a signal or message such as by voice or email.

Also, the DIR is capable of performing a backup of the ICD inputs, including video, to a network, a personal computer (PC), computer readable medium (CRM) or other storage device. The DIR may be programmed to lock to predetermined ICDs having cameras, to maintain integrity of camera signal to DIR device.

In a preferred embodiment of the present invention, the user interface of the ICD inputs on the DIR device include at least one visual cue on the video to tell whether video is being recorded, e.g., a red and/or green dot is shown on the image. Also, preferably, the DIR device has a front with indicator lights that match or correspond to these same visual cues. For quality checking purposes, similarities such as these provide ease of use for the system user to confirm system functionality upon inspection.

The DIR device is programmable for wireless communication with input capture device, including both transmitting data, settings, controlling instructions and receiving input captured from the ICD, like images, video, audio, temperature, humidity, chemical presence, radiation, and the like. Thus, the DIR device is capable of receiving wireless data from the wireless input capture device(s), indicating which of the ICDs is active, recording data and storing data, searching through recorded data, transmitting data and instructions to the ICD, adjusting ICD settings and/or controls, communicating with the controller/server computer to send and/or receive data, and other functions, depending upon the specifications of the system setup, the environment under surveillance, and whether or not remote access is used via the controller/server computer and Internet.

The DIR device's data recordation and storage capability permit inputs from a multiplicity of ICDs to be associated with each DIR device to be singularly received, recorded, stored, and researched by a remote user from the ICDs. The user can search historically recorded data by date, time, event type, or any other means of selecting a setting or event corresponding to the each or any of the ICDs and the environment under surveillance by the system. Each of the ICDs is capable of individualized settings control by a single DIR device; a multiplicity of DIR devices may be controlled and managed by the controller/server, either within a given surveillance environment or in different locations.

Other components of the DIR device include, but are not limited to having a base that may be optionally adjustable for optimized mounting on a surface; having a long range MIMO wireless component; having a one-chip video compression component for resizing video data, recompressing it, and streaming it; having a USB port connectable to a computer, or for storage key, or removable hard drive for data storage; having an ethernet port to connect to a network; having RCA video output like the ICDs; having 2 or 3 USB ports for data output as well as for a USB based security key, having at least one antenna, preferably three antennae, which may be removable and replaceable; having a power control button on the housing; having a recessed reset button in the housing, accessible on the backside of the housing; having a low noise fan; having a hard drive for recording inputs; and/or having at least one, preferably a multiplicity of indicators, preferably light emitting diodes (LEDs), that are viewable by a user on the outside of the housing of the DIR device.

By way of example, in a preferred embodiment of the present invention, the DR device has ten LEDs on the front of the housing, each of which correspond to an individual ICD. Significantly, these indicators, in particular as LEDs, provide content dense visual information with a quick glance from the user. There are five modes that represent ICD status, illustrated for one embodiment in the following table, Table 1:

| LED INDICATOR | CORRESPONDING STATUS |
| --- | --- |
| Off | ICD off |
| Green | ICD connected to DIR device |
| Flashing Green | DIR recording inputs from the ICD |
| Flashing Red | ICD detecting at least one event |
| Red | Error warning |

The error warning may be due to a variety of conditions, such as, by way of example and not limitation, lost connection between the ICD and DIR device, data loss, throughput reduction, etc.

The optional remote controller or server computer (RSC) runs software providing for remote access and control, and is separate from the wireless DIR and the ICDs. Users log in with a username and password from any Internet connected PC, web enabled cell phone, or other Internet enabled or network communicable device, to remotely access or review the wireless input or camera video and/or image(s). The user accesses the system through a user interface operating in connection with a web browser. The RSC communicates directly with the wireless DIR and enables users to remotely configure wireless DIR properties and the ICDs' properties, and, preferably to perform any of the functions that are directly performable for any DIR or ICD, such functions being set forth in the foregoing. The RSC may provide an electronic commerce function such as providing a user to pay for remote access service. The RSC provides an authorized user remote from the target surveillance environment the option of logging into the system, selecting any ICD for monitoring, e.g., select any camera input from any DER, print, save, email image from the input, such as a video clip, and zoom, pan and tilt live video through the DIR, similar control and/or access activities, and combinations thereof.

The RSC functions as a remote monitoring station like a personal computer and is capable of providing a user interface that is accessible through a web browser; the RSC is thus any Internet connectable device, including computer, PDA, cell phone, watch, any network accessible device, and the like, which provides access for at least one remote user. The at least one remote user is preferably a predetermined, authorized user.

Users of the system are preferably authorized, whether access is direct or remote. Apart from direct access, authorization may also determine levels of access for each user. While all capabilities of the DIR and ICDs are controllable remotely, either by the DIR itself or by an Internet communicable device in communication with a server computer that communicates with the DIR(s), the number and type of devices may be limited based upon authorization level of a user.

The RSC provides for user remote access to live and/or recorded audio and/or video for any camera on any DVR; furthermore, control functions permit this user(s) to adjust and to make changes to any DVR or ICD settings remotely. Also, off-line archiving is operable via the user selecting to remotely record to the RSC.

DIR and ICD Communication Locking

In one embodiment of the present invention, a method for locking communication between at least one wireless input capture device ICD(s) and a corresponding digital input recorder (DIR) or other ICD(s), either one-way and/or two-way, is provided, including the steps of providing base system; at least one user accessing the DIR via user interface either directly or remotely; the DIR and/or ICD(s) searching for signal from the ICD(s) and establishing communication with them; and locking the ICDs to send wireless data exclusively to that DIR or ICD; and/or the DIR or ICD locking itself for exclusive communication with the locked ICDs, thereby providing a secure surveillance system for a target environment.

The ICD is activated when at least one user accesses the DIR software by either launching the software directly or launching the DIR device or by clicking on an activation or start button for triggering activity steps within the software and hardware system to activate communication including data exchange between predetermined DIRs and their corresponding selected ICDs. In a preferred embodiment of the present invention the at least one ICD includes a wireless digital camera and the corresponding DIR is a DVR; however, one of ordinary skill in the art will appreciate that the functionality applies to a range of ICDs and corresponding DIRs, with or without video capabilities in each case. When any of these events occur, the DVR initiates checking for signals from prior configured capture devices. If the DVR starts without any prior configured capture devices, then the DVR automatically begins searching for wireless signals from capture devices. If the DVR starts with prior configured capture devices and the user wants to add additional devices, the user clicks on a search button, and the DVR begins searching for wireless signals from capture devices not already configured and communicating with the DVR.

Communication

In a preferred embodiment of the present invention, the DIR is operable to identify signal(s) from the at least one ICD corresponding thereto, and the DIR automatically establishes communication with the identified capture device and creates a named representation, such as an icon or image with a name that represents the active ICD. Also, the DIR is operable to create a named representation for each of the corresponding ICDs associated with that DIR that are identified but not in active communication with the DIR at that time. The non-communication status of these devices is denoted in the representation, for example by at least one indicator having at least one status, as set forth in the foregoing (see, e.g., Table 1). Then, the wireless digital video camera as ICD is operable to send a still image to the DIR interface, where applicable, for the user to confirm identity of the ICD sending the image. Importantly, the smart cross-communication of the ICDs permits inputs processing, comparison, recording, and combinations thereof independently of the RSC or DIR. The user may rename the ICD at that time or at a subsequent time. Importantly, no additional user steps are required to establish the monitoring set-up.

Camera Validation/Communication Optimization

The DVR is further operable to validate the device approval status for communication with the specific DVR and optimizes the wireless signal to the DVR to ensure the greatest information throughput.

Camera Locking/Security Establishment

Preferably, security functionality is operable when a DIR automatically locks a specific ICD, such as to permit sending wireless data only to that specific DIR and automatically initiating security on the data stream. The security methods may include cryptographic methods such as digital signing, stream cipher encryption, block cipher encryption, and public key encryption or hardware based encryption in which each device has a hardware device for encryption included. By way of example and not limitation, WAP, 802.11i, AES, SSL, stream cipher, any other type of security protocol, and combinations thereof may be used.

DIR Locking

Any of the DIRs operable within the system and having at least one ICD associated therewith are further operable to be locked to prevent setting changes or data manipulation from any device apart from the DIR with which each ICD is locked into communication. In one embodiment of the present invention having video capabilities, the DVR as DIR, upon confirming detection of all the signal(s) from ICD(s) associated therewith, confirms the establishment of communication with each detected ICD, in particular wireless digital video camera, and locks the DVR to only communicate with the found device(s), unless it receives instruction from the user to look for other signal(s). The DVR indicates such a locked status, for example, by displaying a lock indicator on the DVR and/or on the ICD to provide an external visual status indication that the ICD(s) are locked and also sends a lock status signal to an entity outside the present system, such as to the RSC and/or an alarm system or security software. Once searching and locking is complete, the DVR will not accept signals from capture devices that are not locked to the DVR, unless directed to search for capture devices by the user by click-selecting the search button 210. Alternatively, the system can notify the user of new ICDs that come into communication with the system during operation and/or after initial setup has occurred.

Camera Removal

ICDs may be removed from operation and/or operational communication or interaction with the system. To remove a capture device from the DVR system, the user click-selects from the user interface on an image and/or name that represents the capture device they want removed and then click-selects a single removal button. The DIR then removes that capture device from the system.

Smart Mesh Camera Networking with Video Content Management

In one embodiment of the present invention, the system includes a smart mesh ICD networking with a video content management. The smart mesh ICD network of the system is operable to provide ICDs to communicate with each other and/or the wireless DIR to act as repeaters, i.e., an extension or repeat functional component, to extend the usable range of the system beyond the range of any individual ICD. Thus, by way of example where the standard range of the wireless DIR to a ICD is 200 ft., using a smart mesh ICD and system according to the present invention provides that a ICD 600 ft. away from the DIR is operable to send a signal to another of the multiplicity of ICDs having digital video input capabilities and corresponding components that is located 400 ft. away, and the second signal is combined with the first signal, which is then sent it to still another or third ICD that is 200 ft. away, and so on, providing an extended signal transmission from a series of wirelessly interconnected ICDs to provide an effective range of security surveillance over a larger target environment that is a distance additive of the range of each of the individual ICDs communicating with each other and the DIR.

In another embodiment of the present invention, in particular wherein the system has video capabilities, the system includes ICDs that are operable to communicate with each other and/or the wireless DIR to exchange data and/or control each other to ensure that important data from ICD inputs is recorded properly with the DIR. By way of example, a first ICD senses the motion of a person moving towards a second ICD and communicates instruction or directive to the second ICD to be aware of the motion sensed by the first ICD and to take appropriate action as programmed or set-up for that ICD, such as to record the sensed motion. The appropriate action may further include capturing and/or recording the inputs at an increased frame rate, an increased resolution, and/or other action to ensure that the important data, in this case motion, is captured or recorded by the second ICD.

In another embodiment of the present invention, in particular wherein the system has video capabilities, the system includes ICDs that are operable to communicate with each other and/or the wireless DIR to exchange data and/or control each other based on a set of rules created by the user. By way of example, a first ICD detects a first motion of a first object that is moving towards a second ICD; wherein the first ICD has been programmed and/or set-up with a rule indicating that if motion moves from the first ICD to a second ICD, then an alarm must be made. The first or second camera can send the alarm to the RSC as the ICDs can share rules with each other.

In another embodiment of the present invention, in particular wherein the system has video capabilities, the system includes ICDs that are operable to communicate with each other and/or the wireless DIR to exchange data and/or control each other to ensure maximum throughput at the appropriate ICDs. By way of example, a first ICD detects a first motion of a first object that is moving towards a second ICD; wherein the first ICD has been programmed and/or set-up to send a status signal to the second ICD to ensure that the second ICD has the throughput it requires to monitor the pending action.

In another embodiment of the present invention, in particular wherein the system has video capabilities, the system includes ICDs that are operable to communicate with each other and/or the wireless DIR to exchange data. Such data includes "content data" that is a separate stream of data from the video data. The ICDs and/or DIR work together to become a content management network whereby the content data is managed. By way of example, in a room monitored by an ICD, a person wearing a red sweater places a box on the floor, opens a door, and leaves. The ICD could detect the following: (1) a moving mass that is the color red, the person's sweater; (2) a movement in an otherwise steady mass, the door; and (3) a new mass now in the image, the box. In addition to the video of the event, the ICD could store the content data of "a person wearing red left a box in the room and walked out the door." This content data can be shared with the DIR and/or other ICDs.

In another embodiment of the present invention, in particular wherein the system has video capabilities, the system includes ICDs that are operable to communicate with each other and/or the wireless DIR to exchange data and/or control each other based on a set of rules created by the user. Such data includes "content data" that is a separate stream of data from the video data. The ICDs and/or DIR work together to become a content management network whereby the content data is managed. By way of example, in a room monitored by an ICD, a person wearing a red sweater places a box on the floor, opens a door, and leaves. The ICD could detect the following: (1) a moving mass that is the color red, the person's sweater; (2) a movement in an otherwise steady mass, the door; and (3) a new mass now in the image, the box. In addition to the video of the event, the ICD could store the content data of "a person wearing red left a box in the room and walked out the door." This content data can be shared with the DIR and/or other ICDs. The content data may trigger a rule, which could be set to issue an alarm if a mass is left in the room, such as the box in the current example. The rule could further include capturing and/or recording the ICD's inputs at an increased frame rate, an increased resolution, and/or other action to ensure that the important data, in this case the video of the new box, is captured or recorded by the ICD.

In another embodiment of the present invention, the at least one ICD includes at least one video capture device or the ICD(s) have digital video input capture capability and components functional for providing the same; and the DIR includes digital video recording (DVR) capabilities and components functional for providing the same. Furthermore, the ICD(s) may be video camera(s) or provide such function similar to video camera(s).

Additionally, microchip(s) within the ICD(s) provide intelligent input capture and learned pattern analysis, such as an ICD with video capability identifying or sensing a mass of an object within its surveillance range, comparing the input characteristics with referenced and/or learned information, labeling the sensed object based on a likely match in the referenced and/or learned information, communicating and/or referencing programmed data to determine if other action is required, and performing the required action, as appropriate. By way of example, a wireless digital camera senses a moving object within its target surveillance area, compares the size and shape of the object with reference information to determine that the moving object is likely a person, checks rules or settings to determine whether sensing the presence of a person is a trigger event for indicating an alarm, and communicating the alarm and/or recording and transmitting the images associated with the moving object (person) to other ICD(s), the DVR, and/or the RSC. In another example, additional inputs such as RFID inputs from tagged objects, identification badges, and the like, may be inputted to the ICD(s) and compared with reference information or settings to activate (or not) a trigger event. Alternatively, the absence of an RFID transmitter on a moving object (person) or stationary object (unauthorized package or object) in a secure area including the target surveillance environment may also be operable to activate a trigger event or alarm, and/or activate other sensors, such as radiation, sound, chemical detection, and the like, and combinations thereof. By way of more detailed example, in the case of video surveillance, where a person enters the target environment under surveillance by the ICDs, and where the person has an employee badge with an RFID or other transmitting capability, either active or passive, embedded or incorporated therein/on, the ICDs video capture identifies the RFID tag data and compares it with existing data or settings stored within the ICD(s). If the RFID tag data does not comport with permissions available for and associated with that ID tag, then the ICD(s) activates a trigger event, such as recording inputs including video, audio, and other data associated with the person detected by the ICD, such as, by way of example and not limitation, clothing color, direction of travel, mass, height, speed, whether the person is carrying anything, movement particulars like jerkiness or injury, and the like. The ICD(s) then cross-communicate to ensure that other ICDs are aware of the non-compliant detection by the first ICD so that they respond accordingly. If the trigger event is an alarm event, then the ICDs are operable to send notification directly to the DIR or through other ICDs to the DIR or RSC, such that corresponding alarm event actions occur, such as further third party notification and inputs recording as required or determined by settings or programming within the system. In preferred embodiments the ICDs are digital video cameras operable to communicate wirelessly with each other, the DIR, and/or the RSC.

In another embodiment according to the present invention, the ICDs within the mesh network are further equipped with wireless communication transmitters, such as cellular phone transmitters or wide band cellular cards for providing cellular transmission/reception by each ICD, to provide each ICD/camera with standalone capability to cross-communicate with each other to extend the effective surveillance area and/or to communicate with each other to transmit and receive information that is further transmitted via the Internet to the RSC. Furthermore, business models using such systems and components with this type of method of operation permit users to access the system and its inputs for monitoring after payment of a monthly service fee. If an authorized user has paid the monthly subscription charge or service fee, then the user may remotely access ICD inputs, including stored data, and can download the stored or recorded input data through the RSC and/or a device in electronic communication with the RSC.

Certain modifications and improvements will occur to those skilled in the art upon a reading of the foregoing description. All modifications and improvements have been deleted herein for the sake of conciseness and readability but are properly within the scope of the claims.

What is claimed is:
1. A system, comprising:
a plurality of intelligent appliances,
the plurality of intelligent appliances including a first intelligent appliance and a second intelligent appliance; and,
a wireless computing device configured to:
detect first wireless data that identifies the first intelligent appliance and second wireless data that identifies the second intelligent appliance;
in response to detecting the first and second wireless data, establish
  (1) a first wireless communication channel through which the first intelligent appliance communicates with the wireless computing device and
  (2) a second wireless communication channel through which the second intelligent appliance communicates with the wireless computing device,
wherein the first and second intelligent appliances are configured to wirelessly communicate with each other through a direct wireless communication channel between the first and second intelligent appliances without an intermediate access point or gateway and
wherein the first wireless communication channel, the second wireless communication channel, and the direct wireless channel belong to a same wireless network; and
receiving, by the wireless computing device and via the first wireless communication channel, at least a portion of environment data captured by the first intelligent appliance,
wherein the environment data includes video, images, sound, temperature data, chemical presence data, motion data, or any combinations thereof regarding a surveillance area;
wherein the system is further configured to:
receive data from a communication device associated with a person;
detect one or more trigger events based, at least in part, on the data received from the communication device associated with the person, reference information, and the at least a portion of the captured environment data; and
in response to detecting the one or more trigger events, causing the second intelligent appliance to perform an action for controlling an associated device within the surveillance area,
wherein at least one setting of the second intelligent appliance is adjusted based on control data generated by the wireless computing device using one or more instances of logic locally stored on the wireless computing device and one or more user settings, wherein the control data is transmitted from the wireless computing device to the second intelligent appliance via the second wireless communication channel.

2. The system of claim 1, wherein the system is further configured to:
receive event input from an operator;
detect at least one of the one or more trigger events in the surveillance area based further on the received event input from the operator; and
coordinate operation of a plurality of intelligent appliances in response to detection of the at least one trigger event,
wherein the plurality of intelligent appliances includes the second intelligent appliance.

3. The system of claim 1, wherein the system is further configured to coordinate operation of the first and second intelligent appliances using the wireless computing device in wireless communication with the first and second intelligent appliance, wherein the wireless computing device stores the data from an operator.

4. The system of claim 1, wherein the wireless computing device is further configured to send data between the first and second appliances to coordinate operation of the first and second appliances without requiring communication with a remove server computer.

5. The system of claim 1, wherein the system is further configured to:
compare a person associated with the one or more events to permission information in a database; and
determine whether the person has permission to be at a certain location within the surveillance area based on the comparison.

6. The system of claim 1, wherein the first intelligent appliance is configured to detect motion in the surveillance area.

7. The system of claim 1, wherein the first and second intelligent appliances each include a camera.

8. The system of claim 1, wherein the same wireless network to which the first wireless communication channel, the second wireless communication channel, and the direct wireless channel belong corresponds to an adaptive mesh network.

9. The system of claim 1, wherein at least one of the one or more trigger events is detection of a person, without permission, within the surveillance area.

10. The system of claim 1, wherein the system is further configured to:
cause an alert to be sent to an operator in response to detection of the one or more trigger events; and
allow the operator to view at least a portion of environment data captured by the system.

11. The system of claim 1, wherein the system is further configured to:
receive data from a device associated with a person;
compare the data from the device to permission data; and
determine whether the person has permission to be within the surveillance area based on the comparison.

12. The system of claim 1, wherein the second intelligent appliance is configured to capture data that includes one or more of: temperature data, chemical presence data, motion data, or any combination thereof.

13. The system of claim 1, wherein the system is further configured to:
analyze at least one of a video or a plurality of still images captured by the first intelligent appliance;
identify an event in the surveillance area based on the analysis of the at least one of the captured video or the captured still images; and
control operation of at least one of the first intelligent appliance or the second intelligent appliance based upon identification of the event.

14. The system of claim 1, wherein the system is further configured to provide an operator interface for accessing and controlling at least one of the first intelligent appliance or second intelligent appliance to perform at least one of:
(a) reviewing, via a remote viewing device, at least one of a video or a plurality of still images captured by the first intelligent appliance, or
(b) controlling, via the remote viewing device, the second intelligent appliance.

15. A wireless device operable on a mesh network including a first intelligent appliance and a second intelligent appliance, comprising:
at least one processor;
at least one network element; and
memory having instructions configured to cause the at least one processor to:
detect the first intelligent appliance and the second intelligent appliance;
in response to detecting the first and second intelligent appliances, establish
(1) a first wireless communication channel through which the first intelligent appliance communicates with the wireless computing device and
(2) a second wireless communication channel through which the second intelligent appliance communicates with the wireless computing device,
wherein the first and second intelligent appliances are configured to wirelessly communicate with each other through a direct wireless communication channel between the first and second intelligent appliances without an intermediate access point or gateway and
wherein the first wireless communication channel, the second wireless communication channel, and the direct wireless channel belong to the mesh network;
receive, via the first wireless communication channel, at least a portion of environment data captured by the first intelligent appliance,
wherein the environment data includes video, images, sound, temperature data, chemical presence data, motion data, or any combinations thereof;
receive user data from a communication device associated with at least one person;
detect one or more trigger events based, at least in part, on the user data, reference information, and the at least a portion of the captured environment data; and
in response to detecting the one or more trigger events, cause the second intelligent appliance to perform an action,
wherein at least one setting of the second intelligent appliance is adjusted based on control data generated by the wireless device using at least one or more instances of logic locally stored on the memory,
wherein the control data is transmitted from the wireless device to the second intelligent appliance via the second wireless communication channel.

16. The wireless device of claim 15, wherein the instructions are configured to cause the at least one processor to coordinate operation of a plurality of intelligent appliances, wherein the plurality of intelligent appliances includes at least one of the first intelligent appliance or the second intelligent appliance.

17. The wireless device of claim 15, wherein the instructions are configured to cause the at least one processor to: coordinate operation of a plurality of intelligent appliances including the second intelligent appliance on the mesh network in response to detection of at least one trigger event.

18. The wireless device of claim 15, wherein the instructions are configured to cause the at least one processor to perform tracking within a surveillance environment based on permission settings set by an operator.

19. The wireless device of claim 15, wherein the instructions are configured to cause the at least one processor to cause an alert to be sent to an operator in response to detection of a person located within a surveillance area; and allow viewing of at least a portion of environment data captured by at least one of the first intelligent appliance or the second intelligent appliance.

20. The wireless device of claim 15, wherein the instructions are configured to cause the at least one processor to identify an event within a surveillance environment based on the at least a portion of captured environment data and at least one operator-set detection rule; and perform at least one of activating an alarm or sending a notification, in response to the identifying of the event.

21. The wireless device of claim 15, wherein the action performed by the second intelligent appliance includes capturing one or more of video, still images, or temperature data.

* * * * *